US011347536B2

(12) United States Patent
Dickmann et al.

(10) Patent No.: US 11,347,536 B2
(45) Date of Patent: May 31, 2022

(54) ARCHITECTURES FOR HYPERCONVERGED INFRASTRUCTURE WITH ENHANCED SCALABILITY AND FAULT ISOLATION CAPABILITIES

(71) Applicant: VMware, Inc., Palo Alto, CA (US)

(72) Inventors: Christian Dickmann, Niestetal (DE); Zhao Jin, Shanghai (CN); Zongliang Li, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 239 days.

(21) Appl. No.: 16/840,203

(22) Filed: Apr. 3, 2020

(65) Prior Publication Data
US 2021/0224097 A1 Jul. 22, 2021

Related U.S. Application Data

(63) Continuation of application No. PCT/CN2020/072500, filed on Jan. 16, 2020.

(51) Int. Cl.
| G06F 9/46 | (2006.01) |
| G06F 9/455 | (2018.01) |
| G06F 9/50 | (2006.01) |
| H04L 67/1097 | (2022.01) |
| H04L 41/0893 | (2022.01) |

(52) U.S. Cl.
CPC ........ G06F 9/45558 (2013.01); G06F 9/5077 (2013.01); H04L 41/0893 (2013.01); H04L 67/1097 (2013.01); G06F 2009/45583 (2013.01); G06F 2209/505 (2013.01); G06F 2209/5011 (2013.01)

(58) Field of Classification Search
CPC ............... G06F 9/45558; G06F 9/5077; G06F 2009/45583; G06F 2209/5011; G06F 2209/505; H04L 41/0893; H04L 67/1097
USPC ............................................................ 718/1
See application file for complete search history.

(56) References Cited

U.S. PATENT DOCUMENTS

| 9,851,906 | B2 * | 12/2017 | Sarkar | ................. G06F 3/0617 |
| 10,826,795 | B2 * | 11/2020 | Leibovici | .............. G06F 3/0685 |
| 2013/0227558 | A1 * | 8/2013 | Du | ......................... H04L 67/18 |
| | | | | 718/1 |

(Continued)

OTHER PUBLICATIONS

"Administering VMware Virtual SAN", VMware, 2017 (Year: 2017).*

Primary Examiner — Bradley A Teets
(74) Attorney, Agent, or Firm — Dentons US LLP

(57) ABSTRACT

Architectures for computing clusters with enhanced scalability and fault isolation capabilities are described. The enhanced capabilities are enabled by partitioning hosts of the clusters into multiple storage domains of the cluster. Each of the hosts includes processing and storage resources. The resources are logically partitioned into a processing layer and a storage layer of the cluster. The processing layer includes a virtualized processing resource for each of the storage domains. The storage layer includes a virtualized datastore for each of the storage domains. The processing layer provides users with access to virtualized machines (VMs). The storage layer provides the VMs with access to virtualized datastores of the associated storage domain. The aggregated resources of the host computing devices within the cluster may be employed to instantiate the processing layer and the storage layer of the cluster.

27 Claims, 12 Drawing Sheets

(56) References Cited

U.S. PATENT DOCUMENTS

| | | | |
|---|---|---|---|
| 2014/0068127 A1* | 3/2014 | Baron | G06F 9/526 |
| | | | 710/200 |
| 2019/0026303 A1* | 1/2019 | Guerra Delgado | ............ |
| | | | G06F 16/2237 |
| 2019/0056877 A1* | 2/2019 | Kolesnik | G06F 12/023 |
| 2020/0403985 A1* | 12/2020 | Mahadevan | H04L 41/0893 |
| 2021/0019161 A1* | 1/2021 | Hadas | G06F 9/45545 |

* cited by examiner

ARCHITECTURES FOR HYPERCONVERGED INFRASTRUCTURE WITH ENHANCED SCALABILITY AND FAULT ISOLATION CAPABILITIES

This application is a continuation of PCT/CN2020/072500, entitled "ARCHITECTURES FOR HYPERCONVERGED INFRASTRUCTURE WITH ENHANCED SCALABILITY AND FAULT ISOLATION CAPABILITIES", filed Jan. 16, 2020, the contents of which is hereby incorporated by reference in its entirety.

FIELD

The present disclosure relates generally to distributed-computing systems and, more specifically, to enhanced hyperconverged infrastructure (HCI) architectures for computing systems that provide virtualized processing, storage, and networking services, where the systems include an enhanced architecture that enables enhanced scalability and fault isolation/recovery.

BACKGROUND

As vendors increasingly rely on distributed-computing systems to provide traditional products and services, the demand on these systems is significantly accelerating. Furthermore, new computing- or information-related products and services, which are also provided by such systems, continue to emerge in the marketplace. Thus, the acceleration of the demand on the systems is further exacerbated. In response to these ever-increasing usage demands, system administrators frequently increase the systems' processing, storage, and networking capabilities by making additional resources available to the systems. For instance, administrators may include additional host computing devices in a system.

Modern distributed-computing systems are already complex and can include thousands of entangled host computing devices, virtualized machines (VMs), and networking components. Attempts to meet the accelerating usage demands by scaling out systems via conventional methods are resulting in ever-increasing complexity and entanglement within the systems. This continual cycle of growth and increasing system complexity often leads to various degradations in system performance (e.g., increasing system latency, decreasing available bandwidth, and decreasing fault isolation/recovery capabilities), as well as increases in the difficulty of system administration, management, and/or maintenance.

For example, host computing devices may be distributed across a plurality of host clusters within a distributed-computing system. The clustered host computing devices typically include physical hardware resources that are virtualized to provide VMs and virtualized storage area networks (vSANs). For data storage purposes, each of the host computing devices within a particular cluster of the plurality of clusters may share a common virtualized datastore, such as a vSAN. As more hosts are added to the cluster, the demands on the common datastore increase, degrading the performance of the cluster and ultimately limiting the ability to grow the cluster (e.g., by adding additional hosts to the cluster) via traditional methods. Another consequence of continually growing a cluster is a commensurate increase in the size of the fault domain associated with any given fault within the system. As the cluster grows, the processing and storage resources of each of the hosts within the cluster become increasingly entangled with the processing and storage resources of the other hosts in the cluster. This increasing entanglement attenuates the ability to effectively isolate and recover from faults within the system. Thus, the impact of a fault in any of the thousands of hosts may affect the resources of another host in the cluster, again degrading the performance of the cluster and ultimately limiting the ability to grow the cluster.

OVERVIEW

Described herein are methods and techniques for operating computing clusters (e.g., a cluster of host computing devices) within a distributed-computing cluster. Thus, the cluster may include a plurality of host computing devices. In one embodiment, a management computing device at least partially performs a method of operating the cluster. The management computing device has at least one or more processors and one or more memory devices. The method includes uniquely associating each of the plurality of host computing devices with one of a plurality of storage domains of the cluster. Associating each of the plurality of host computing devices generates a distribution of the plurality of host computing devices amongst the plurality of storage domains. Each of the plurality of host computing devices includes a physical processing resource and a physical storage resource. The method may further include, for each of the plurality of storage domains, aggregating the physical processing resource of each of the host computing devices associated with the storage domain to form a virtualized processing resource of the storage domain. For each of the plurality of storage domains, the physical storage resource of each of the host computing devices associated with the storage domain may be aggregated to form a virtualized datastore of the storage domain. The method may further include, based on the distribution of the plurality of host computing devices amongst the plurality of storage domains, employing the plurality of host computing devices to provide a plurality of virtualized machines (VMs). Each of the plurality of VMs may be associated with one of the plurality of storage domains, is implemented by at least a portion of the virtualized processing resource of the associated storage domain, and has access to at least a portion of the virtualized datastore of the associated storage domain.

In another embodiment, a non-transitory computer-readable storage medium storing one or more programs configured to be executed by one or more processors is provided. The one or more programs stored by the non-transitory computer-readable storage medium include instructions for operating a computing cluster that includes a plurality of host computing devices. The instructions include uniquely associating each of the plurality of host computing devices with one of a plurality of storage domains to generate a distribution of the plurality of host computing devices amongst the plurality of storage domains. Each of the plurality of host computing devices may include each of a physical processing resource and a physical storage resource. The instructions may further include, for each of the plurality of storage domains, aggregating the physical processing resource of each of the host computing devices associated with the storage domain to form a virtualized processing resource of the storage domain. The physical storage resource of each of the host computing devices associated with the storage domain may be aggregated to form a virtualized datastore of the storage domain. The instructions may further include, based on the distribution of the plurality of host computing devices amongst the plurality of storage domains, employing the plurality of host computing devices to provide a plurality of virtualized machines (VMs). Each of the plurality of VMs may be associated with one of the plurality of storage domains, may be implemented by at least a portion of the virtualized processing resource of the associated storage domain, and may have access to at least a portion of the virtualized datastore of the associated storage domain.

In still another embodiment, a distributed-computing system may include a computing cluster and a management device. The computing cluster may include a plurality of host computing devices. The management computing device may have one or more processors and memory storing one or more programs configured to be executed by the one or more processors. The one or more programs may include instructions for uniquely associating each of the plurality of host computing devices with one of a plurality of storage domains to generate a distribution of the plurality of host computing devices amongst the plurality of storage domains. Each of the plurality of host computing devices may include a physical processing resource and a physical storage resource. The instructions may further include, for each of the plurality of storage domains, aggregating the physical processing resource of each of the host computing devices associated with the storage domain to form a virtualized processing resource of the storage domain. The instructions also include, for each of the plurality of storage domains, aggregating the physical storage resource of each of the host computing devices associated with the storage domain to form a virtualized datastore of the storage domain. In some embodiments, and based on the distribution of the plurality of host computing devices amongst the plurality of storage domains, the plurality of host computing devices may be employed to provide a plurality of virtualized machines (VMs). Each of the plurality of VMs may be associated with one of the plurality of storage domains, may be implemented by at least a portion of the virtualized processing resource of the associated storage domain, and may have access to at least a portion of the virtualized datastore of the associated storage domain.

DETAILED DESCRIPTION

Figure 1B:
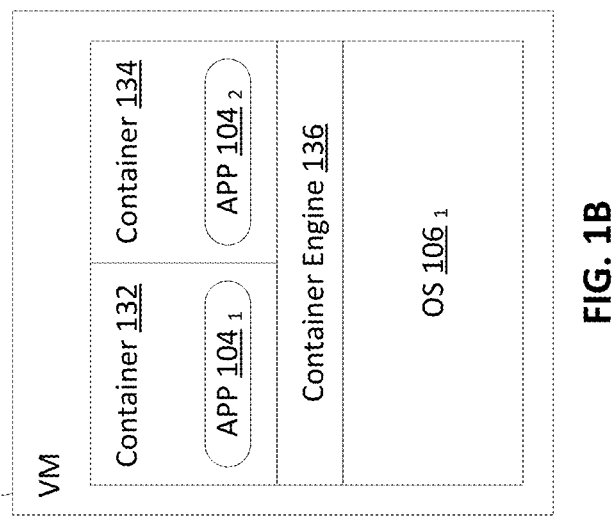
FIG. 1B is a block diagram illustrating a containerized application framework for implementing various components of a distributed-computing system, in accordance with some embodiments.

In the following description of embodiments, reference is made to the accompanying drawings in which are shown by way of illustration specific embodiments that can be practiced. It is to be understood that other embodiments can be used and structural changes can be made without departing from the scope of the various embodiments.

The herein embodiments are directed towards distributed-computing systems that include a cluster of host computing devices (e.g., a hyperconverged infrastructure (HCI) cluster) that is architected for enhanced scalability and fault isolation via a partitioning of the cluster's resources into multiple storage domains. Each of the host computing devices (or hosts) within the host computing device cluster (or cluster) includes physical resources that are employable for providing various processing and storage services to system users. For example, the hosts within a cluster may include processing and/or storage resources. More specifically, the physical resources of hosts included in a cluster may be logically partitioned and/or allocated into a processing layer and a storage layer of the cluster. The processing layer may include a virtualized processing resource comprising an aggregated pool of at least a first subset of the physical resources (e.g., processing resources) of the host computing devices. The storage layer may include a virtualized datastore comprising an aggregated pool of a second subset of the physical resources of the host computing devices. Generally, the processing layer may provide virtualized processing (or computing) services to the system's users and the storage layer may provide virtualized data storage and/or data retrieval services to the users. For instance, the processing layer may be responsible for providing users with access to the information processing capabilities of one or more virtualized machines (VMs). The storage layer may be responsible for providing one or more VMs (or users of the VMs) with access to the information storage and retrieval capabilities of one or more virtualized datastores (e.g., a virtual storage area network (vSAN)). The aggregated resources of the host computing devices within the cluster may be employed to instantiate the processing layer and the storage layer of the cluster.

As discussed throughout, and in order to enhance the ability to scale-out (or grow) an enhanced cluster, the resources of the enhanced cluster's hosts are partitioned via a subdividing (or distribution) of the resources into a plurality of separate storage domains. Subdividing the hosts into the plurality of separate storage domains enables scaling out the system, without increasing the entanglement of the resources, degrading the quality of the provided services, or increasing the cluster's maintenance overhead. Furthermore, subdividing the hosts into separate storage domains also enhances the cluster's fault isolation/recovery capabilities. Each storage domain within the cluster may implement one or more VMs and publish a virtualized datastore for the storage domain. Subdividing the hosts into separate storage domains may be referred to throughout as associating each of the hosts with one of the storage domains, where each host is associated with a single storage domain, and each storage domain may be associated with (or include) one or more hosts.

Each VM implemented by a host associated with (or included in) a particular storage domain of the plurality of storage domains may access the particular datastore published by the particular storage domain. For example, the VMs of the particular storage domain may read data from and/or write data to the particular datastore published by the particular storage domain. Furthermore, the VMs of the particular storage domain may share access to the particular datastore. Thus, the particular datastore may be referred to as a common and/or shared datastore of the storage domain because at least a portion of the VMs implemented by the particular storage domain may share access to the particular datastore. The particular datastore may be isolated from other VMs implemented by the cluster. That is, the access to the particular datastore of the particular storage domain may be restricted, such that VMs implemented by other storage domains in the cluster cannot access the particular datastore. Thus, access to each datastore of the cluster may be restricted to those VMs within the storage domain, providing isolation between the storage domains.

The cluster may be scaled-out by the generation or creation of new and/or additional storage domains within the cluster. Adding additional storage domains grows the cluster without increasing the complexity of the cluster's administration, management, and/or maintenance tasks. Furthermore, the processing and storage resources within and between the multiple storage clusters may be sufficiently disaggregated such that a fault domain of any particular fault within the cluster may be limited to only the resources that are highly-associated and/or correlated with the fault. The enhanced fault isolation capability enables enhanced fault recovery and/or fault tolerance mechanisms within the cluster.

As noted above, increasing usage demands on distributed-computing systems may necessitate the growth of the processing resources and/or the storage resources available to such systems. Accordingly, system administrators frequently scale out their systems by adding additional host computing devices to the systems. As further discussed above, employing conventional methods to include additional hosts within a conventional cluster may increase the demands on and/or complexity of a common (or shared) datastore accessible to the cluster. Furthermore, as more physical processing and/or storage resources are added to conventional clusters, virtualization of the resources may increasingly entangle the system's resources, resulting in a corresponding increase of a fault domain of any particular fault within the conventional cluster. That is, adding additional hosts to a conventional cluster may degrade the performance of the cluster, increase the difficulty of fault isolation, and increase the complexity of the system's administration, management, and/or maintenance tasks. Thus, the ability to grow a conventional cluster may be limited via conventional methods.

In order to enable system growth, some administrators may limit the number of hosts permitted in any given conventional cluster. For instance, in some conventional distributed-computing systems, the size of a cluster is limited to less than or equal to 32 hosts. Rather than grow the size of the cluster beyond its upper bound, administrators may conventionally scale-out a system by adding additional conventional clusters to the system, while limiting the size of each conventional cluster. However, this trade-off between limiting the size of the cluster and increasing the number of clusters within the system may increase the complexity of the administration, management, and/or maintenance of the system. As additional clusters are added to the system, an administrator may be required to manually attend to each of the numerous conventional clusters, rather than a single cluster. As the number of clusters within a system continues to grow, the administration, management, and/or maintenance of each of the clusters may become untenable and/or impractical.

To address such system growth and fault isolation/recovery issues, the various herein embodiments are directed towards operating a distributed-computing system, where the number of hosts within an enhanced cluster may increase without practical limit. Rather than scaling out a distributed system by increasing the number of conventional clusters, the host computing devices (e.g., host machines or hosts) in an enhanced cluster may be subdivided, distributed, allocated, and/or partitioned into a plurality of discrete and/or separate storage domains. For example, each host is associated with one of the plurality of storage domains, and each of the plurality of storage domains may be associated with multiple hosts. Because the resources of the hosts are subdivided into at least partially disaggregated or isolated storage domains, the cluster may be scaled-out without degrading its performance, without decreasing the ability to isolate system faults, or without increasing the complexity of system administration, management, and/or maintenance.

More specifically, the processing resources of the host computing devices associated with a particular storage domain of the cluster may be aggregated to form a virtualized processing (or computing) resource for the particular storage domain. Likewise, the storage resources of the host computing devices associated with the particular storage domain may be aggregated to a form a virtualized storage resource (e.g., a virtualized datastore) for the particular storage domain. The virtualized processing resource of each storage domain may be implemented via one or more virtualization layers of the clusters. The aggregated virtualized processing resources (or the virtualized layer of the cluster) may include or implement one or more virtual machine monitors (VMMs), such as, but not limited to, a hypervisor. The VMMs of the virtualization layer of each of the storage domains may be configured to host (or implement) and provide one or more VMs, which in turn may provide processing and/or computation services to the system users. The storage resource of each storage domain may be configured to provide a virtualized datastore (e.g., a vSAN) of the storage domain, which in turn may provide data and/or information services to the users.

Even more specifically, each host computing device within an enhanced cluster may be associated with one of the multiple of storage domains of the cluster. Each storage domain of the cluster may be comprised of and/or associated with multiple host computing devices, while each host computing device in the cluster is included in and/or associated with exactly one of the storage domains. The hosts within a single storage domain may be communicatively coupled with one another. In some embodiments, processing resources of each host may be logically disaggregated from the hosts' storage resources. The processing resources of each of the hosts within a particular storage domain may be aggregated to form the virtualized processing resource (e.g., that implement one or more VMMs) of the particular storage domain. The storage resources of each of the hosts within the particular storage domain may be aggregated to form and publish the virtualized storage resource (e.g., a datastore) of the particular storage domain. Via its processing resource, each host may implement one or more VMMs (e.g., a hypervisor), and each VMM may provide, instantiate, host, and/or implement one or more VMs. Each of the hosts (and each of the hosted VMs) of the particular storage domain may access at least a portion of the corresponding datastore published by the particular storage domain. In some non-limiting embodiments, a VM hosted by the particular storage domain may be excluded from accessing the datastores published by storage domains other than its hosting storage domain.

Because each storage domain of the cluster is separate and discrete from each of the other storage domains within the cluster, each storage domain may be separately configurable to conform to separate storage domain policies. A storage domain policy for a particular storage domain may be specifically configured to enhance any particular service provided by, or associated with, the particular storage domain. Furthermore, because the storage domains may be isolated from one another, any fault occurring within the particular storage domain may be isolated to the particular domain and may not substantially affect the other domains. Thus, the effect of any system fault may be isolated to the corresponding storage domain, and the fault domain of the fault may be limited to the corresponding storage domain.

The storage domains provide an underlying and organizing structure within the cluster, such that growth of the cluster is systematically organized, configured, arranged, and manageable as a single cluster. The virtualized processing resources of each of the storage domains are aggregated to form a processing pool of the cluster, and the virtualized storage resources of each of the storage domains are aggregated to form a storage pool of the cluster. The separation of the hosts into multiple storage domains and aggregating the processing and storage resources into corresponding processing and storage pools enables a disaggregation of the cluster's processing resources from the cluster's storage resources. For example, the host computing device cluster may be subdivided into a processing sub-cluster (e.g., the processing resource pool) that is disaggregated from a storage sub-cluster (e.g., the storage resource pool) of the cluster. The disaggregation of the processing resources and the storage resources provides additional fault isolation within a cluster, while providing an underlying organizing structure for the growth of the cluster. Although the processing resource pool may be disaggregated from the storage resource pool, a subset of the processing resource pool that is associated with a particular storage domain may have at least partial access to a subset of the storage resource pool that is also associated with the particular storage domain.

The reliability and durability of the operation of the cluster may be sufficient, such that the cluster may be said to be a high availability (HA) cluster and the services provided by the cluster may be referred to as HA services. In such embodiments, the HA cluster may be enabled to provide continuous service, without significant interruption and for a sufficient amount of time, so that users and clients of the cluster may reliably depend on the high availability of the cluster's services, and without significant interruption. As discussed below, to implement the HA services, each of the cluster's VMMs may include one or more modules that operate to ensure the HA services. In some embodiments, one or more modules of a VMM may include at least an HA module that monitors the VMs of the implementing VMM for faults, and performs various fault isolation/recovery mechanisms required to ensure the high availability of the cluster's services. Because the storage domains may be separate, the HA modules may be configured in a master/slave arrangement, where one of the hosts in the cluster includes a HA master module, and all the other hosts include a HA slave module. The HA master module may coordinate the actions of the HA slave modules.

Each of the VMMs (e.g., hypervisors) and each of the virtualized datastores implemented by the each of the storage domains may be managed by a single management entity (e.g., a management computing device of the system) that implements a cluster management model. Even though the processing and storage resources of the storage domains are aggregated to form pools, such that the administration, management, and maintenance of the resources at a management computing device are simplified, any fault within the system may be effectively isolated to the underlying processing and/or storage resources. The management model may at least partially enable the above discussed HA services via resource scheduling, load balancing, and/or fault isolation/recovery configurations of the management model. Thus, when scheduling or load balancing the utilization of a system's resources, as well as performing fault isolation and recovery tasks (or other such tasks), the system may be administered, managed, and/or maintained at the level of a single cluster, rather than numerous smaller clusters. Thus, the difficulty of managing numerous clusters (as in the case for conventional clusters) is avoided via the various embodiments. As used throughout, the terms "virtual" and "virtualized" may be used interchangeably.

Figure 1A:
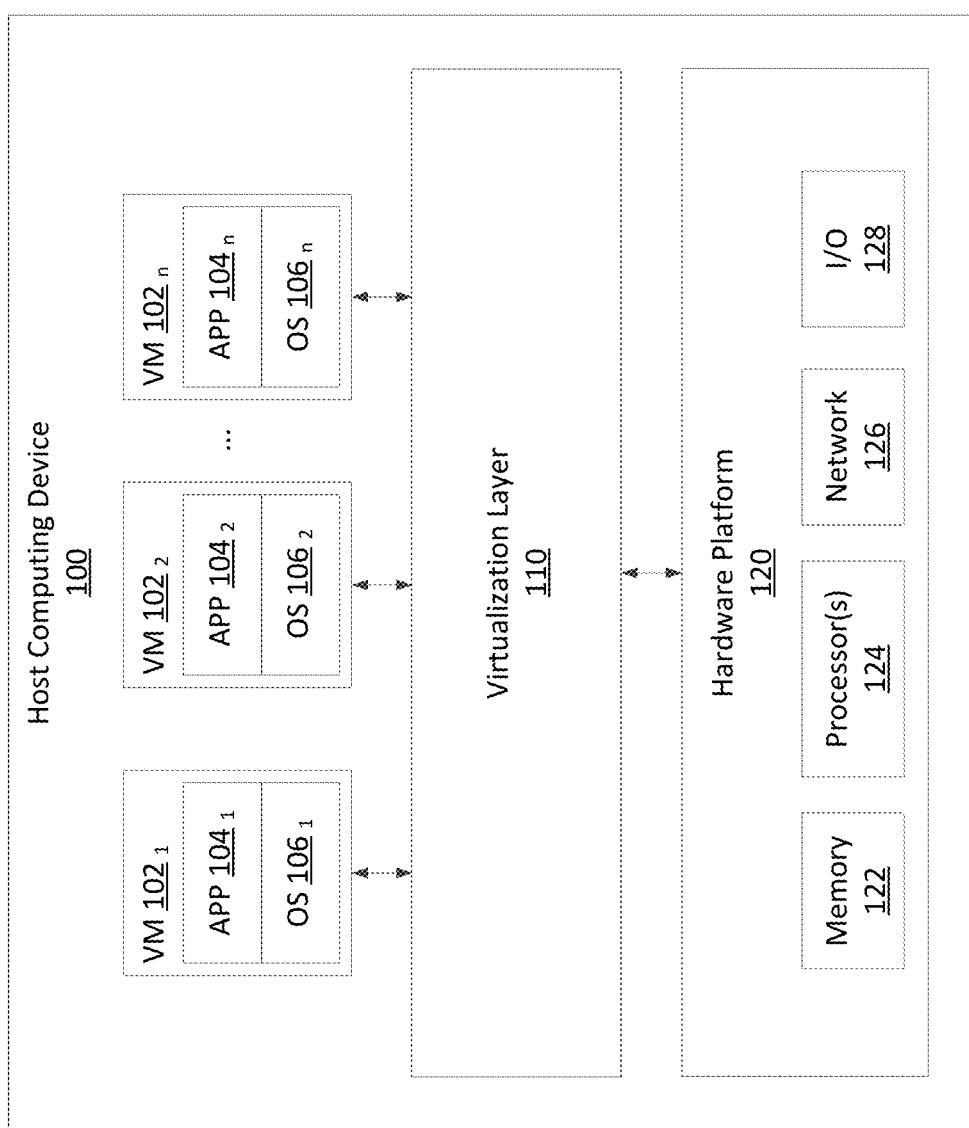
FIG. 1A is a block diagram illustrating a system and environment for implementing various components of a distributed-computing system, in accordance with some embodiments.

Turning now to FIG. 1A, FIG. 1A is a block diagram illustrating a system and environment for implementing various components of a distributed-computing system, according to some embodiments. As shown in FIG. 1, virtual machines (VMs) $102_1$, $102_2$ ... $120_n$ are instantiated on host computing device 100. A host computing device, such as but not limited to host computing device 100, may be referred throughout as a host machine, a host device, or simply a host. In some embodiments, host computing device 100 implements one or more elements of a distributed-computing system (e.g., host computing device cluster 220 of FIGS. 2A-2B, storage domain 300 of FIGS. 3A-3B, and host computing device cluster 420 of FIGS. 4A-4B). Hardware platform 120 includes memory 122, one or more processors 124, network interface 126, and various I/O devices 128. Memory 122 includes computer-readable storage medium. The computer-readable storage medium may be tangible and/or non-transitory. For example, memory 122 may include high-speed random access memory and/or non-volatile memory, such as one or more magnetic and/or solid-state disk storage devices (e.g., disks 258, disks 278, and/or disks 298 of FIG. 2C), flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, may also be referred to as a virtual machine monitor (VMM) or a hypervisor. Virtualization layer 110 may be a software layer that provides an execution environment within which multiple virtual machines (VMs) 102 are concurrently instantiated and executed. A VM may be referred throughout as a guest computing machine, or simply a guest machine. The virtualization layer 110 may be a Type-1 VMM (e.g., a native or bare-metal hypervisor) or a Type-2 VMM (e.g., a hosted hypervisor). The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

FIG. 1B is a block diagram illustrating a containerized application framework for implementing various components of a distributed-computing system, in accordance with some embodiments. More specifically, FIG. 1B illustrates VM $102_1$ implementing a containerized application framework. Containerization provides an additional level of abstraction for applications by packaging a runtime environment with each individual application. Container 132 includes App $104_1$ (i.e., application code), as well as all the dependencies, libraries, binaries, and configuration files needed to run App $104_1$. Container engine 136, similar to virtualization layer 110 discussed above, abstracts App $104_1$ from OS $106_1$, while enabling other applications (e.g., App $104_2$) to share operating system resources (e.g., the operating system kernel). As a result of this abstraction, each App 104 runs the same regardless of the environment (e.g., as though it has its own dedicated operating system). In some embodiments, a container (e.g., container 132 or 134) can include a gateway application or process, as well as all the dependencies, libraries, binaries, and configuration files needed to run the gateway applications.

It should be appreciated that applications (Apps) implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2A:
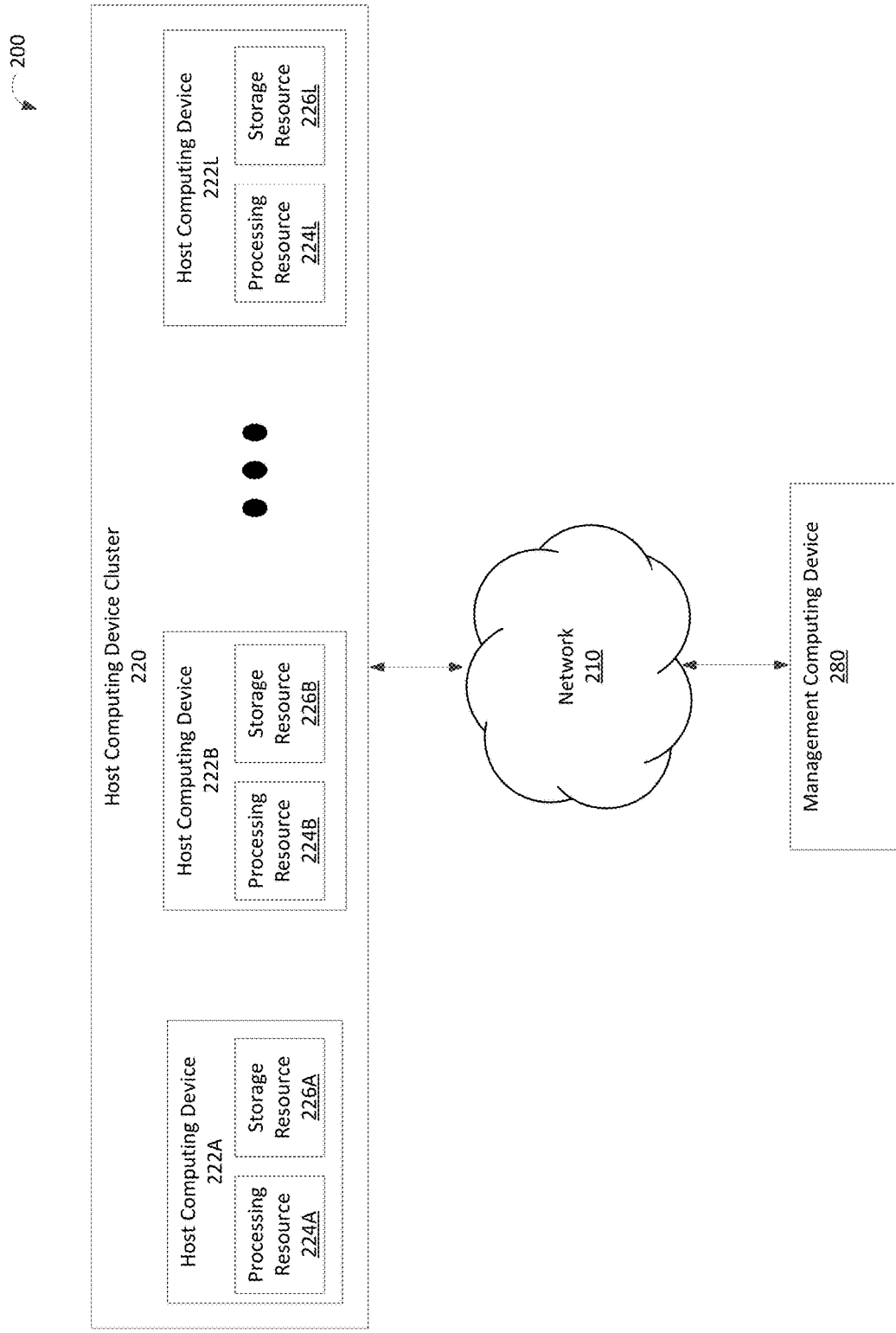
FIG. 2A is a block diagram illustrating a distributed-computing system, in accordance with some embodiments.

FIG. 2A is a block diagram illustrating a distributed-computing system 200, in accordance with some embodiments. Distributed-computing system 200 (or simply system 200) may be a system that provides enhanced hyper-converged infrastructure (HCI) to users. As discussed in conjunction with at least FIG. 2B, system 200 may provide virtualized services, such as, but not limited to, virtualized processing (or computational) services (e.g., via one or more VMs), virtualized storage services (e.g., via one or more vSANs), or virtualized networking services, to users. To provide such services, system 200 may include a cluster of multiple instances of host computing devices (e.g., host computing device cluster 220). Host computing device cluster 220 (or simply cluster 220) may include multiple instances of host computing devices, such as, but not limited to, host computing device 100 of FIG. 1A. In the non-limiting embodiment shown in FIG. 2A, cluster 220 includes L host computing devices. In the nomenclature adopted for FIG. 2A, L may be any positive integer. More specifically, cluster 200 includes host computing devices 222A, 222B, . . . , 222L. Host computing devices 222A-222L may form a set of host computing devices. Because cluster 220 includes a set of host computing devices, cluster 220 may be referred to as, or include, a set of host computing devices.

As shown in FIG. 2A, each of the host computing devices included in the set of host computing devices may include a processing resource and a storage resource. For example, host computing device 222A includes processing resource 224A and storage resource 226A, host computing device 222B includes processing resource 224B and storage resource 226B, and host computing device 222L includes processing resource 224L and storage resource 226L. In general, a particular host's processing resources may include a virtualization of the particular host's physical resources that is configured and arranged to provide various processing services. Similarly, the particular host's storage resource may include a virtualization of the particular host's physical resources that is configured and arranged to provide various data storage and data retrieval services.

More particularly, an aggregated portion of the particular host's physical resources may implement the particular host's processing resource. Likewise, at least another aggregated portion of the particular host's physical resources may implement the particular host's storage resource. For example, an aggregation of a first subset of the particular host's physical resources may implement the particular host's processing resource, while an aggregation of a second subset of the particular host's physical resources may implement the particular host's storage resource. The aggregated first subset of the particular host's physical resources may be disaggregated from the second subset of the particular host's physical resources. In some embodiments, the first and second subsets of the particular host's physical resources may include at least some intersection or overlap of the implementing physical resources. In other embodiments, the first and second subsets of the particular host's physical resources may be non-intersecting and/or non-overlapping subsets. Each of the processing and storage resources of a host computing device may include or be implemented by various components of a hardware platform of the host computing device (e.g., hardware platform 120 of FIG. 1A). That is, a processing resource of a host computing device may include, employ, or at least have access to at least one of a portion of the memory, processor(s), network, and I/O of the host computing device. Likewise, a storage resource of the host computing device may include, employ, or at least have access to at least one of a portion of the memory, processor(s), network, and I/O of the host computing device.

In other words, the processing resource of a host computing device may include a logical partitioning or virtualization of at least some portion of the underlying hardware platform that may be employed to perform various processing services (e.g., implementing one or more virtualization layers and/or one or more VMs as shown in FIGS. 1A-1B). Similarly, the storage resource of the host computing device may include a logical partitioning or virtualization of at least some portion of the underlying hardware platform that may be employed to perform various storage services (e.g., implementing and/or publishing one or more virtualized datastores). FIG. 2A is not intended to be limiting, and as noted above, a first subset of a host's resources that is dedicated to the host's processing resource may have a non-zero intersection with a second subset of the host's resources that is dedicated to the host's storage resource. That is, the processing resource and the storage resource of the host's computing device may include, employ, have access to, or share one or more common components of the hardware platform of the host computing device. In other non-limiting embodiments, the first subset of a host's resources that is dedicated to the host's processing resource may have no intersection with the second subset of the host's resources that is dedicated to the host's storage resource.

Figure 4A:
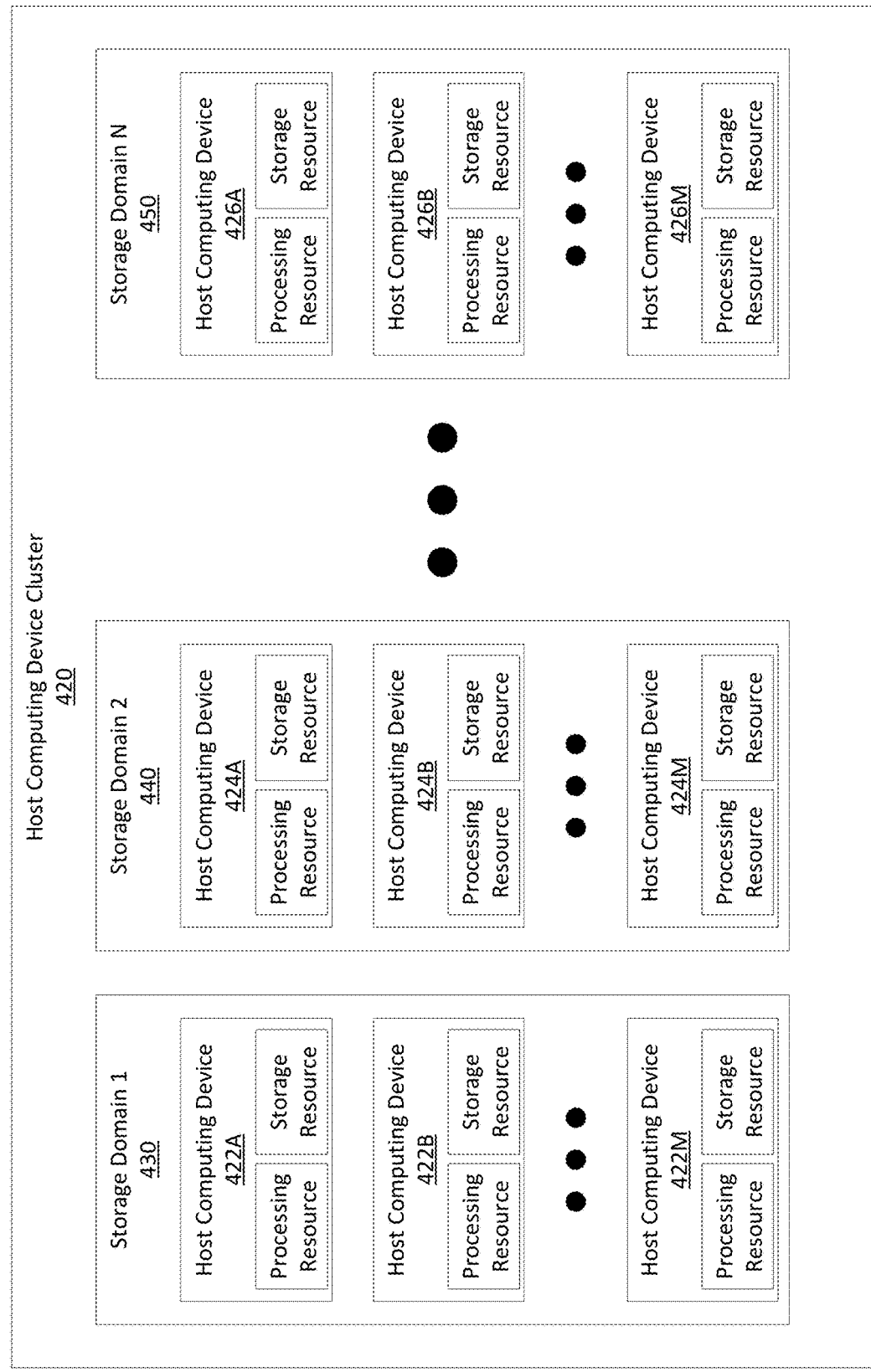
FIG. 4A is a block diagram illustrating a host computing device cluster, in accordance with some embodiments.
Figure 4B:
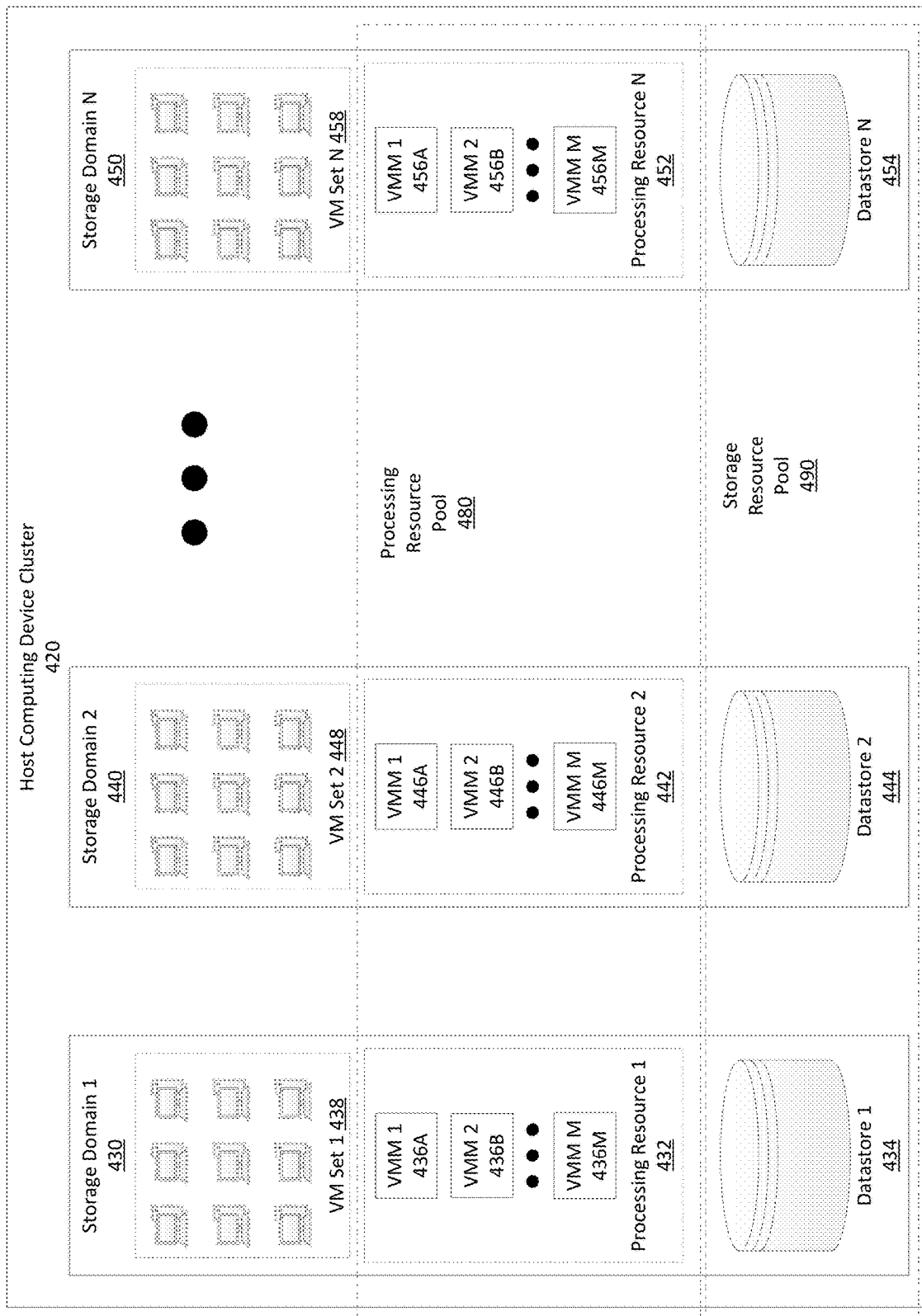
FIG. 4B is a block diagram illustrating additional details of the host computing device cluster of FIG. 4A, in accordance with some embodiments.

Although not shown in FIG. 2A, but as further discussed in conjunction with at least FIGS. 4A-4B, host computing device cluster 220 (or equivalently the set of host computing devices) may be subdivided, distributed, or partitioned into a plurality of storage domains. Each storage domain includes, or is associated with, a proper subset of the set of host computing devices. For example, cluster 220 may include N storage domains, where N is a positive integer less than or equal to L. The set of L host computing devices may be subdivided into N proper subsets of host computing devices. Each of the N subsets of host computing devices may be non-overlapping and/or non-intersecting with each of the other (N−1) subsets of host computing devices. Each of the N proper subsets of host computing devices may be associated with one of the N storage domains of cluster 220. In such embodiments, each one of the L host computing devices is associated with, assigned to, or included in exactly one of the N storage domains, where each of the N storage domains may include, or be associated with, multiple instances of L host computing devices.

In addition to cluster 220, system 200 may include a management computing device 280, where host computing device cluster 220 and management computing device 280 are communicatively coupled via a wireless and/or wired communication network (e.g., network 210). Management computing device 280 may provide administrative, management, and/or maintenance services to cluster 220. In order to provide such management services, management computing device 280 may implement one or more cluster management models. Such a cluster management model may be configurable based on dynamic resource utilization of the cluster's resources. As discussed in conjunction with at least FIG. 2B, such management services may include, but are not necessarily limited to, the scheduling (or dynamic allocation) of processing, storage, and networking resources of cluster 220. For instance, management computing device 280 may provide various real-time (or at least near real-time) services directed towards load balancing of resources, as well as services directed towards fault isolation, fault tolerance, and/or fault recovery. A management model may manage the growth or scaling out of cluster 220. For example, as new hosts are added to cluster 220, the management model may determine which existing storage domains to associate new hosts with, or determine to generate or create additional storage domains within cluster 220 based on the model's configuration and current utilization of each of the storage domain's resources. Management computing device 280 may be implemented via one or more physical computing devices (e.g., host computing device 100 of FIG. 1A, one or more VMs (e.g., VM 102 of FIGS. 1A-1B)), or a combination thereof. That is, the administrative, management, and/or maintenance services provided by management computing device 280 may be implemented via physical resources, virtualized resources, or a combination thereof.

As noted above, within a particular host computing device of the plurality of hosts associated with a particular storage domain of cluster 220, the particular host's processing resource may be disaggregated from the particular host's storage resource. In such embodiments, a first subset of the particular host's resources may be dedicated to a virtualized processing resource for the particular storage domain and a second subset of the particular host's resources may be dedicated to a virtualized storage resource of the particular storage domain. In some of these embodiments, the first and second subsets of the particular host's resources are non-intersecting and/or non-overlapping subsets of the particular host's resources. In other of these embodiments, the first and second subsets of the particular host's resources may include at least some mutual intersection of the particular host's resources.

In still other embodiments, a first subset of the hosts associated with the particular storage domain are dedicated to the virtualized processing resource of the particular storage domain, while a second subset of the hosts associated with the particular storage domain are dedicated to the virtualized storage resource (e.g., the published datastore) of the particular storage domain. In some of these embodiments, the first and second subsets of the hosts associated with the particular storage domain are non-intersecting and/or non-overlapping subsets of the hosts associated with the particular storage domain. In other of these embodiments, the first and second subsets of the hosts associated with the particular storage domain may include at least some mutual intersection of the hosts associated with the storage domain.

In some embodiments, the number of host computing devices associated with a single storage domain may be limited via a configuration of a management model for the cluster. For example, the cluster management model may be configured for a maximal amount of hosts per domain (e.g., a maximum of 32 host computing devices per storage domain). The default size of a storage domain (e.g., the maximal number of hosts per storage domain) may be configurable based on usage demands, customer needs, or other relevant factors. When additional host computing devices are added to the cluster, the hosts may be added to storage domains that include less than the maximal amount of allowed hosts. If no storage domains are available for the inclusion of additional hosts, or each of the existing storage demands does not include enough bandwidth to accommodate additional hosts, at least one additional storage domain may be added to the cluster, and the additional hosts may be included in at least one additional storage domain. In this way, the cluster may be scaled-out indefinitely by the addition of new storage domains to the cluster, while the size of any particular storage domain is finite and constrained via one or more configurations of the management model.

The management model may be instantiated, implemented, or actuated by management computing device 280. Thus, management computing device may be employed to generate, deploy, and/or create additional storage domains and grow the cluster. In order to free up the cluster's resources for efficient deployment and utilization, as well as various load-balancing and fault recovery tasks, the cluster management model may also be employed to decommission or recycle storage domains based on the dynamical demands on the cluster, as well as the current resources available to the system. When additional hosts are added to the cluster, the cluster management model may be employed to place the hosts in specific storage domains, by associating the additional hosts with existing storage domains that include less than the maximal amount of hosts (or are that otherwise currently under-utilized), or by generating new storage domains. In some embodiments, the management model may be configured to implement various heuristics or policies when associating hosts with the specific storage domains. For example, the management model may implement one or more processing and/or storage load balancing policies or heuristics, as well as one or more fault isolation and fault recovery policies or heuristics.

Figure 2B:
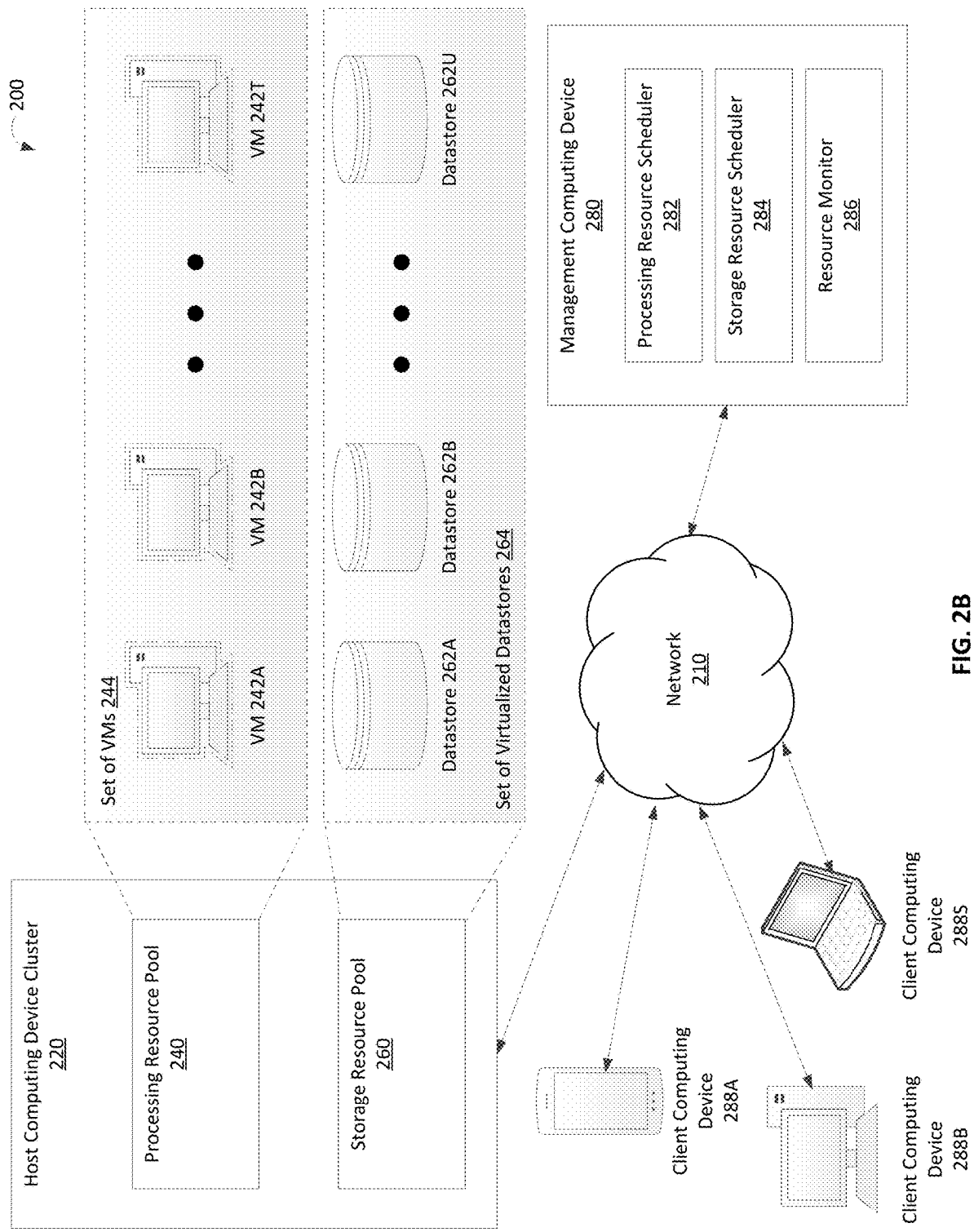
FIG. 2B is a block diagram illustrating additional details of the distributed-computing system of FIG. 2A, in accordance with some embodiments.

FIG. 2B is a block diagram illustrating additional details of the distributed-computing system 200 of FIG. 2A, in accordance with some embodiments. Any number of client computing devices (e.g., S client computing devices, where S is any positive integer) may be in communication with system 200. By being communicatively coupled via network 210, system 200 may provide hyper-converged services to users of client computing devices (i.e., users of system 200), such as, but not limited to, client computing devices 288A, 288B, . . . , 288S. Although client computing devices 288A-288S are illustrated as physical computing devices, it should be understood that the embodiments are not so limited, and one or more of the client computing devices may be a virtualized device (e.g., VM 102 of FIGS. 1A-1B).

As discussed throughout, the processing and storage resources of the host computing devices of cluster 220 may be pooled and/or aggregated, such that cluster 200 may be logically portioned into a virtualized processing layer (e.g., processing resource pool 240) and a virtualized storage layer (e.g., storage resource pool) 260. Although not shown in FIG. 2B, but discussed throughout, the host computing devices included in cluster 200 may be subdivided into a plurality of storage domains. The utilization of storage domains within cluster 220 provides a disaggregation of the processing resources from the storage resources of the host computing devices, such that cluster 220 may be subdivided into a processing sub-cluster (e.g., processing resource pool 240) that is disaggregated from a storage sub-cluster (e.g., storage resource pool 260) of the cluster 220.

The processing resources of processing resource pool 240 may be employed to provide the processing services enabled by T VMs to the users of client devices 288A-288S, where T is any positive integer. Processing resource pool 240 has instantiated a set of VMs 242, that includes T instantiations of a VM: VM 242A, VM 242B, . . . , VM 242T. Similarly, the data storage resources of storage resource pool 260 may be employed to provide data storage and data retrieval services to the users client computing devices 288A-288S. More specifically, storage resource pool 260 may be configured to provide the data services of one or more virtualized datastores included in a set of virtualized datastores 264. In the nomenclature adopted for FIG. 2B, the set of datastores 244 may include U virtualized datastores: datastore 262A, 262B . . . , 262U, where U is any positive integer. Various embodiments of a virtualized datastore, such as, but not limited to, datastores 262A-262U, may include a virtual storage area network (vSAN). Embodiments of a vSAN are discussed in conjunction with vSAN 230 of FIG. 2C. In combination, the processing resource pool 240 and the storage resource pool 260 of host computing device cluster 220 may be employed to provide the hyper-converged services of distributed-computing system 200 to client computing devices 288A-288S.

As discussed in conjunction with at least FIG. 2A, host computing device cluster 220 may be subdivided into N discrete storage domains, where N is a positive integer. Non-overlapping and/or non-intersecting proper subsets of the set of VMs 244 may be implemented by the host computing devices associated with, assigned to, or included in each of the N storage domains. Thus, each of the VMs included in the set of the VMs 244 may be associated with exactly one of the N storage domains. Note that each storage domain may implement more than one of the VMs. Likewise, non-overlapping and/or non-intersecting proper subsets of the set of virtualized datastores 264 may be implemented by the host computing devices associated with, assigned to, or included in each of the N storage domains. In some non-limiting embodiments, each of the U datastores may be associated with, assigned to, or included in exactly one of the N storage domains. In such embodiments, U=N. Thus, in some non-limiting embodiments, each of the plurality of storage domains may instantiate and publish one virtualized datastore that is available to each of the VMs, such that each of the storage domains has exactly one virtualized datastore. Each of the VMs instantiated by a particular storage domain may have access to the virtualized datastore of the particular storage domain, but the VMs of the particular storage domain may be restricted from accessing the other virtualized datastores of the other storage domains.

In order to administer, manage, and/or maintain the hyper-converged services of cluster 220, management computing device 280 may include at least one of a processing resource scheduler 282, a storage resource scheduler 284, and/or a resource monitor 286 that either singly or in combination implement one or more cluster management models. When implementing the cluster management models, storage resource scheduler 284 is generally responsible for selecting a particular storage domain to deploy a new VM within the cluster 220 based on the workloads and/or utilizations of the datastore and/or host computing machines associated with each of the storage domains. Furthermore, storage resource scheduler 284 may be responsible for balancing the workloads of each of the datastores included in the set of datastores 264 and deploying and/or decommissioning any of the datastores. Processing resource scheduler 282 is generally responsible for selecting a specific host computing device within a particular storage domain to implement a new VM to be deployed by the storage domain, load-balancing the workloads of the VMs within any of the storage domains during and after the new VM is deployed, and the like. Resource monitor 286 is generally responsible for monitoring processing resource pool 240 and storage resource pool 260 to detect any faults within the system 200. Upon detection of such a fault, resource monitor 286 may perform various services to isolate and recover from the fault.

Because each storage domain of cluster 220 is separate and discrete from each of the other storage domains within cluster 220, each storage domain may be separately configurable to conform to separate policies (or best practices), via management computing device 280. The configuration of a particular storage domain may be specifically targeted towards the services provided by, or associated with, the particular storage domain. Furthermore, because the storage domains may be isolated from one another, any fault occurring within the particular storage domain is isolated to the particular domain and may not substantially affect the other domains. Thus, the effect of any system fault may be isolated to the corresponding storage domain, and the fault domain of the fault may be limited to the corresponding storage domain.

The storage domains provide an underlying and organizing structure within cluster 220, such that growth of the cluster 220 is systematic, organized, and manageable as a single cluster. The virtualized processing resources of each of the storage domains are aggregated to form processing resource pool 240, and the virtualized storage resources of each of the storage domains are aggregated to form storage resource pool 260. The storage domains provide a disaggregation of the processing resources from the storage resources, such that the host computing device cluster 220 may be subdivided into a processing sub-cluster (e.g., the processing resource pool 240) that is disaggregated from a storage sub-cluster (e.g., the storage resource pool 260) of cluster 220. The disaggregation of the processing resources and the storage resources provides additional fault isolation within cluster 220, while providing an underlying organizing structure for the growth of cluster 220.

As discussed is conjunction with at least FIG. 4B, the processing resource of each of the storage domains may include one or more VMMs (e.g., hypervisors). Each of the VMMs and each of the virtualized datastores implemented by the each of the storage domains may be managed by a single management entity (e.g., a management computing device 280 of system 200) that implements the cluster management model. Even though the processing and storage resources of the storage domains are aggregated to form corresponding resource pools, such that the administration, management, and maintenance of the resources at a management computing device are simplified, any fault within the system may be effectively isolated to the underlying processing and/or storage resources. Thus, when scheduling or load balancing the utilization of the systems' resources, as well as performing fault isolation and recovery tasks (or other such tasks), system 200 may be administered, managed, and/or maintained at the level of a single cluster (e.g., cluster 220), rather than numerous smaller clusters. Thus, the difficulty of managing numerous clusters (as in the case for conventional clusters) is avoided via the various embodiments.

Figure 2C:
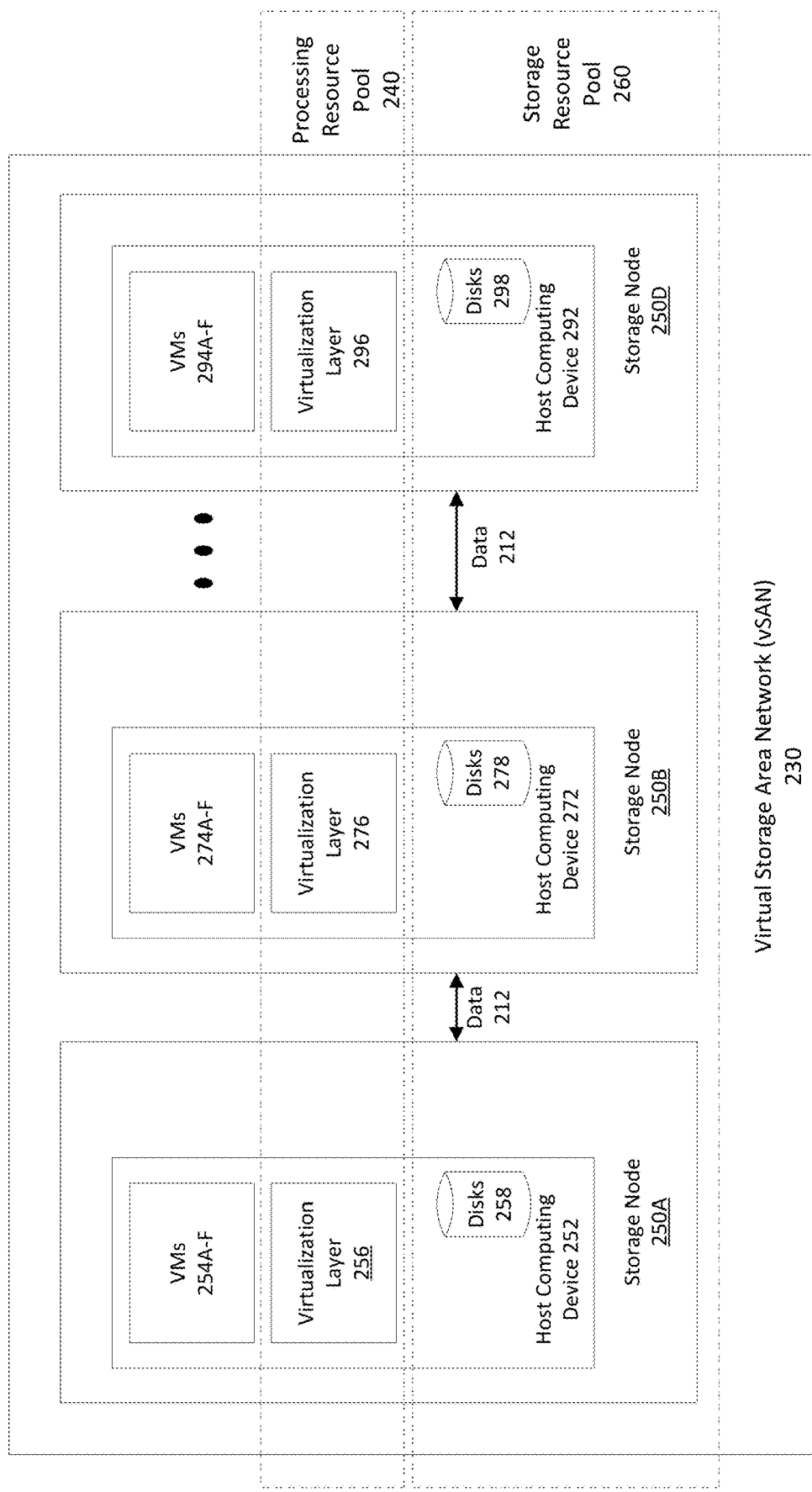
FIG. 2C is a block diagram illustrating a virtual storage area network, in accordance with some embodiments.

FIG. 2C is a block diagram illustrating a virtual storage area network (vSAN) 230, in accordance with some embodiments. As described above, a vSAN is a logical partitioning of a physical storage area network and may be published by a storage domain to serve as a virtualized datastore for the storage domain. Thus, any of virtualized datastores 262A-262U of FIG. 2B may include at least some of the components or features of vSAN 230. Accordingly, vSAN 230 may be included in the host computing device, such as, but not limited to, host computing device cluster 220 of FIGS. 2A-2B.

In general, a vSAN divides and allocates a portion of or an entire physical storage area network into one or more logical storage area networks, thereby enabling the user to build a virtualized storage pool. vSAN 230 may include D storage nodes, where D is any positive integer. In the non-limiting embodiment illustrated in FIG. 2C, vSAN 230 can include a cluster of storage nodes 250A-D, which can be an exemplary virtualized storage pool. In some embodiments, each storage node of the cluster of storage nodes 250A-D can include a host computing device. FIG. 2C illustrates that storage node 250A includes a host computing device 252; storage node 250B includes a host computing device 272, and storage node 250D includes a host computing device 292. In some embodiments, the host computing devices (e.g., devices 252, 272, and 292) can be implemented using host computing device 100 described above.

In the embodiment illustrated in FIG. 2C, and similar to the embodiments described in FIG. 1A, host computing device 252 operating in storage node 250A may (but need not to) include a virtualization layer 256 and one or more virtual machines 254A-F (collectively as VMs 254). In the nomenclature adopted for FIG. 2C, F may be any positive integer. In addition, host computing device 252 can also include one or more disks 258 (e.g., physical disks) or disk groups. In some embodiments, VM 254 can have access to one or more physical disks 258 or disk groups via virtualization layer 256 (e.g., a virtual machine monitor (VMM) and/or a hypervisor). Likewise, host computing device 272 operating in storage node 250B may include a virtualization layer 276, one or more virtual machines 274A-F, and disks 278. Similarly, host computing device 292 operating in storage node 250D may include a virtualization layer 296, one or more virtual machines 294A-F, and disks 298. In the description of this application, a storage node may sometimes also be referred to as a host computing device. In various embodiments, various disks (e.g., disks 258, 278, and 298) or other non-volatile memory devices included in storage nodes 250A, 250B, . . . , 250D may be aggregated to form a virtualized datastore for an associated storage domain of cluster 220. Thus, VMs provided by the associated storage domain may have access to storage resources of the storage nodes that comprise the published datastore. Thus, in FIG. 2C, any of VMs 254, 274, and 294 may have access to any of disks 258, 278, and 298.

Data 212 can be communicated among storage nodes 250A-D in vSAN 230. One or more storage nodes 250A-D can also be logically grouped or partitioned to form one or more virtualized storage pools such as clusters of storage nodes (e.g., a virtualized datastore of an associated storage node). The grouping or partitioning of the storage nodes can be based on pre-configured data storage policies such as fault tolerance policies. For example, a fault tolerance policy (e.g., a redundant array of independent disks policy or a RAID policy) may require that multiple duplicates of a same data component be stored in different storage nodes (e.g., nodes 250A-250D) such that data would not be lost because of a failure of one storage node containing one duplicate of the data component. Such a policy thus provides fault tolerance using data redundancy. In the above example, each duplicate of the entire data component can be stored in any one of storage nodes 250A-250D.

As shown in FIG. 2C, at least some portion of the storage resources (e.g., disks 258, 278, and 298) of one or more of the included host computing devices may be allocated in the storage resource pool 260 of the cluster (e.g., cluster 220). In the non-limiting embodiment of FIG. 2C, at least some portion of the processing resources (e.g., virtualization layers 256, 276, and 296 and VMs 254, 274, and 294) of one or more of the included host computing devices may be allocated to the processing resource pool 240 of cluster 220. Thus, in the embodiment of FIG. 2C, the disaggregation of cluster's 220 processing resources and the storage resources to form a processing sub-cluster (e.g., processing resource pool 240) that is disaggregated from a storage sub-cluster (e.g., storage resource pool 260) is a disaggregation of the processing and storage resources within individual host computing devices.

Other embodiments are not so constrained, and some host computing devices within cluster 220 may be dedicated to the processing resource pool 240, while other host computing devices within cluster 220 are allocated to the storage resource pool 260. In such embodiments, a first subset of the set host computing devices included in host computing device cluster 220 may be allocated to the processing resource pool 240. A second subset of the set host computing devices included in host computing device cluster 220 may be allocated to the storage resource pool 260. The first and second subsets of host computing devices may be non-overlapping and/or non-intersecting subsets of the set of host computing devices. That is, in some embodiments not shown in FIG. 2C, the disaggregation of cluster's 220 processing resources and the storage resources to form a processing sub-cluster (e.g., processing resource pool 240) that is disaggregated from a storage sub-cluster (e.g., storage resource pool 260) respects physical boundaries between the host computing machines within cluster 220.

In embodiments where a first subset of the host computing devices are dedicated to processing resource pool 240 and a second subset of the host computing devices are dedicated to the storage resource pool 260, various trade-offs between the processing resources and the storage resources included in each host computing device may be made. For example, host computing devices included in the first subset that are dedicated to the processing resource pool 240 may have a greater amount of processing resources and a lesser amount of storage resources. In contrast, host computing devices included in the second subset that are dedicated to the storage resource pool 260 may have a greater amount of storage resources and a lesser amount of processing resources. For instance, the host computing devices dedicated to processing resource pool 240 may include specialized processors with specialized processing pipelines that increase the performance of virtualization layers 256, 276, and 296. In contrast, host computing devices dedicated to storage resource pool 240 may include larger disks 258, 278, and 298 and faster data transmission busses to increase the storage space and data throughput performance of a virtualized datastore, such as, but not limited to, vSAN 230.

Figure 3A:
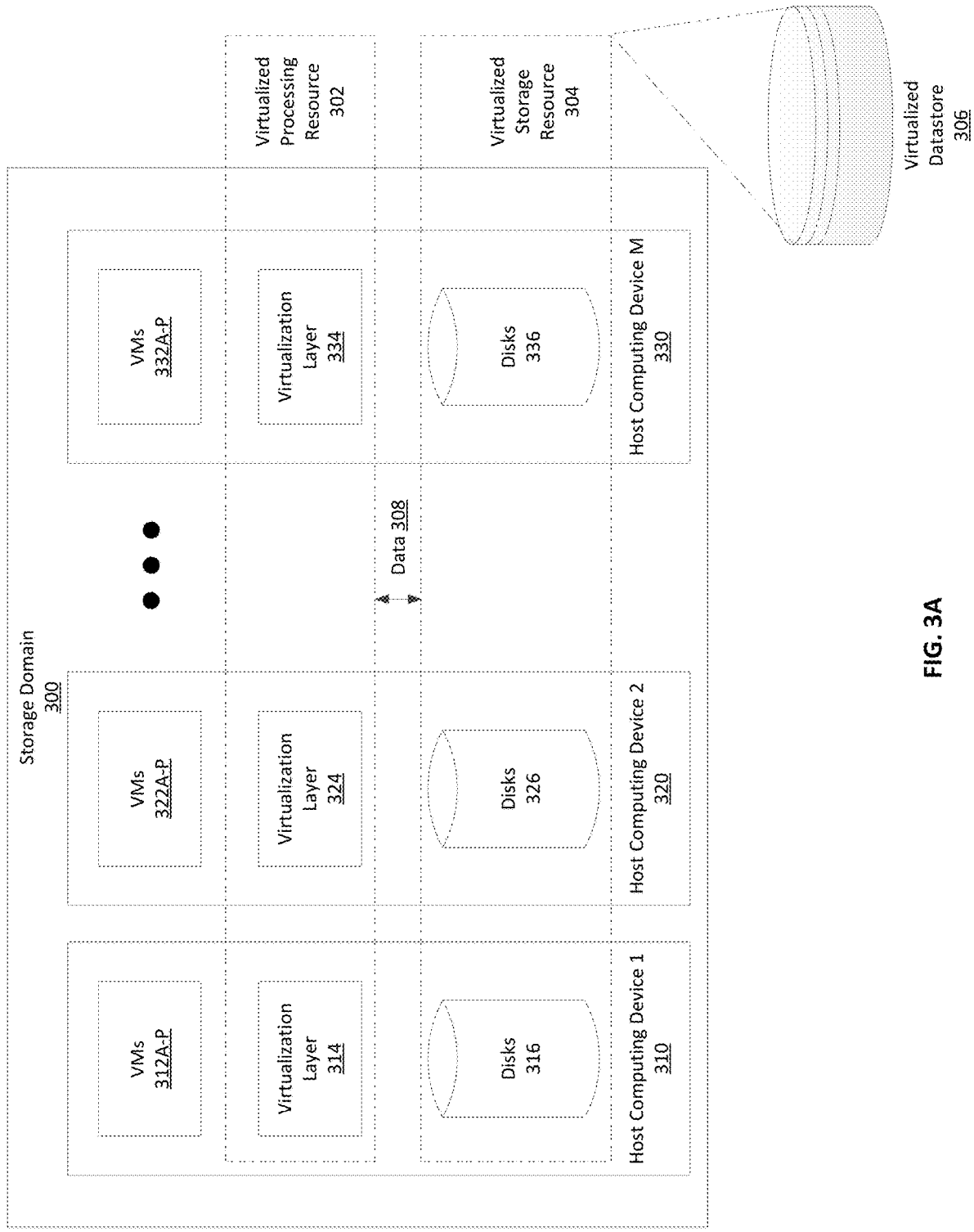
FIG. 3A is a block diagram illustrating a storage domain, in accordance with some embodiments.

FIG. 3A is a block diagram illustrating a storage domain 300, in accordance with some embodiments. Storage domain 300 may be included in a cluster of host computing devices, such as, but not limited to, host computing device cluster 220 of FIGS. 2A-2B and host computing device cluster 420 of FIGS. 4A-4B. As shown in FIGS. 4A-4B, a cluster (e.g., cluster host computing device cluster 420) may include multiple instances of a storage domain, such as, but not limited to, storage domain 300. Storage domain 300 may include M host computing devices, where M is a positive integer. As shown in FIG. 3A, storage domain 300 includes host computing device_1 310, host computing device_2 320, . . . , host computing device_M 330. Each of the host computing devices may include a virtualization layer (e.g., a virtual machine monitor (VMM) or a hypervisor), which may host or otherwise implement one or more VMs. As shown in the non-limiting embodiment of FIG. 3A, each of the visualization layers is hosting P VMs, where P is any positive integer. Each of the host computing devices of storage domain 300 may additionally include one or more storage disks. For example, host computing device 310 includes disks 316 and visualization layer 314, which is hosting VMs 312A-P. Host computing device 320 includes disks 326 and visualization layer 324, which is hosting VMs 322A-P. Likewise, host computing device 330 includes disks 336 and visualization layer 334, which is hosting VMs 332A-P.

As shown in FIG. 3A, at least a portion of the processing resources of the host computing devices (e.g., virtualization layers 314, 324, and 334) may be aggregated to form virtualized processing resource 302 of the storage domain 300. Similarly, at least a portion of the storage resources of the host computing devices (e.g., disks 316, 326, and 336) may be aggregated to form virtualized storage resource 304 of the storage domain 300. The virtualized storage resource 304 may be published by storage domain 300 as a virtualized datastore 306. As discussed throughout, virtualized datastore 306 may include at least similar components or features as a vSAN, such as, but not limited to, vSAN 230 of FIG. 2C. The virtualized processing resource 302 of storage domain 300 may be disaggregated from the virtualized storage resource 304 and/or the virtualized datastore 306 of storage domain 300. The disaggregation of the virtualized processing resource 302 from the virtualized storage resource 304 may enhance the fault isolation capabilities of storage domain 300. Even though the virtualized processing resource 302 is disaggregated from the virtualized storage resource 304, the disaggregated resources 302 and 304 may communicate data 308 back and forth. Thus, at least a portion of virtualization layers 314, 324, and 334 and/or at least a portion of VMs 312, 322, and 332 may have access to the storage services of virtualized datastore 306.

Figure 3B:
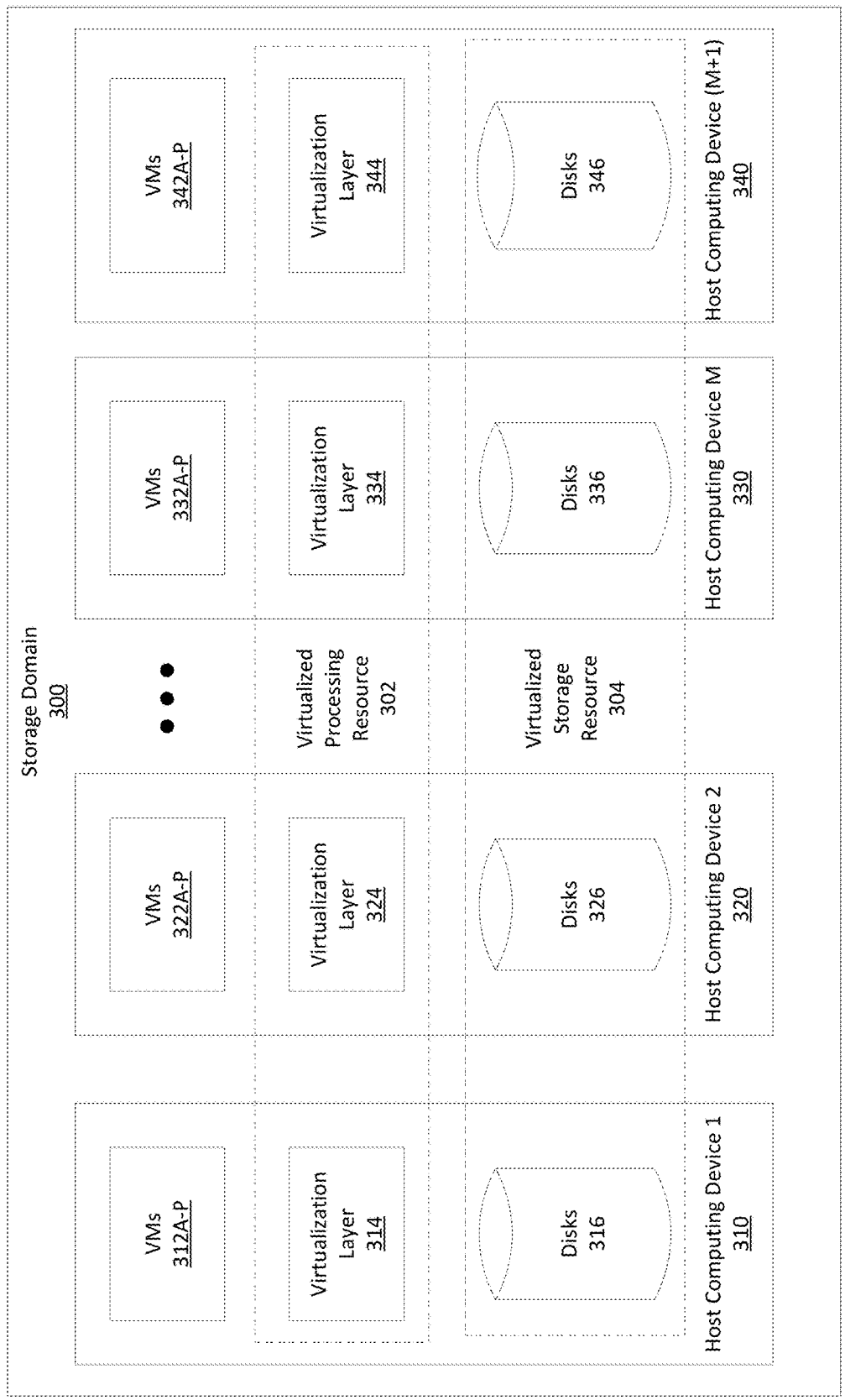
FIG. 3B is a block diagram illustrating the storage domain of FIG. 3A being scaled-out via the inclusion of an additional host computing device, in accordance with some embodiments.

Storage domain 300, and a cluster that includes storage domain 300, may be scaled-out or grown via the inclusion of additional host computing devices in the storage domain 300. FIG. 3B is a block diagram illustrating the storage domain 300 of FIG. 3A being scaled-out via the inclusion of an additional host computing device, in accordance with some embodiments. More specifically, FIG. 3B illustrates the inclusion of an additional host computing device (i.e., host computing device_(M+1) 340 in storage domain 300. The processing resources of host computing device_(M+1) 340 (e.g., virtualization layer 344) have been included in the virtualized processing resource 302 of storage domain 300. Thus, the virtualized processing resource 302 of storage domain 300 has been scaled-out, grown, and/or increased by the inclusion of the additional host computing device. Likewise, the storage resources of host computing device_(M+1) 340 (e.g., disks 346) have been included in the virtualized storage resource 304 of storage domain 300. Thus, the virtualized storage resource 304 of storage domain 300 has been scaled-out, grown, and/or increased by the inclusion of the additional host computing device.

Figure 4C:
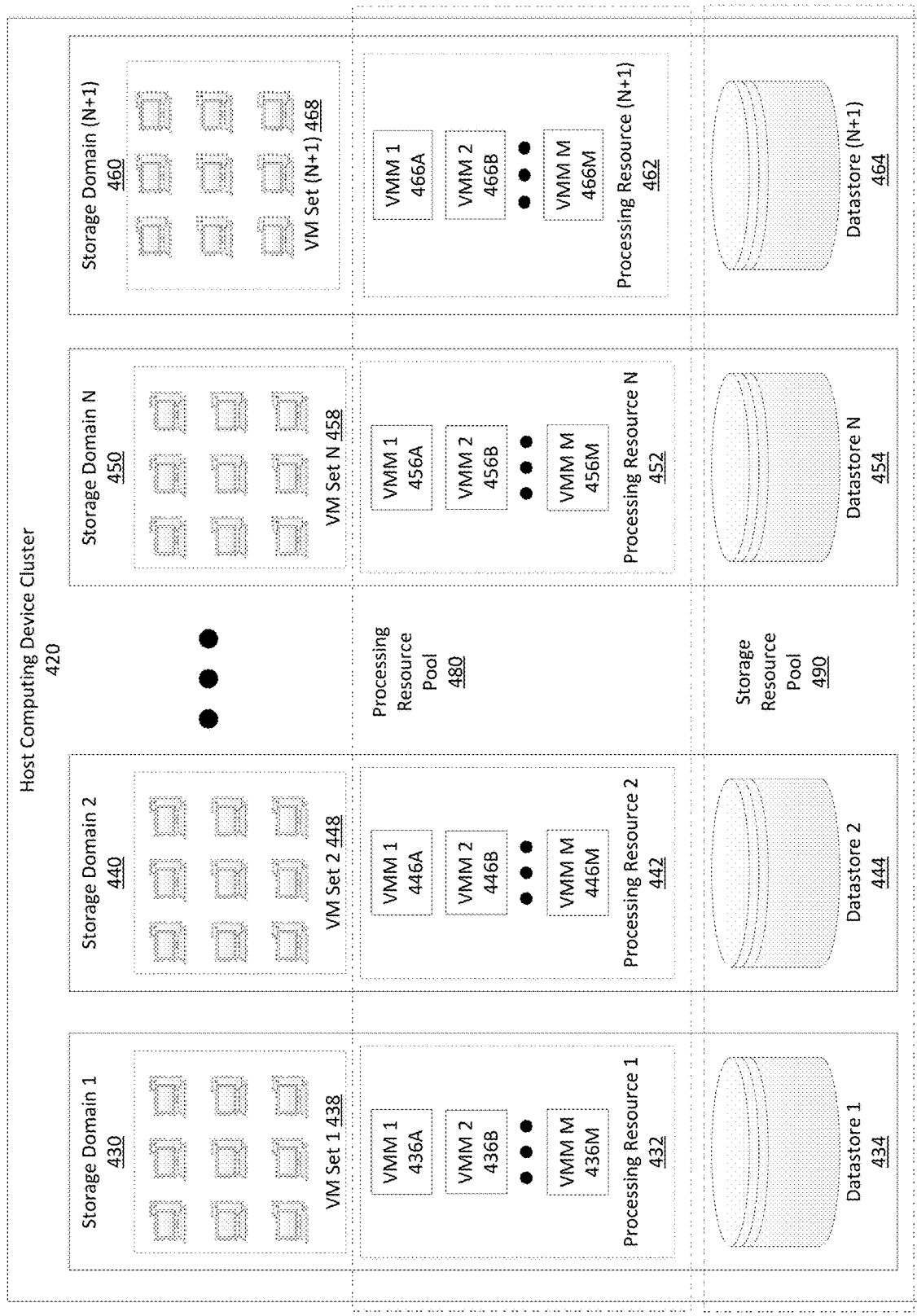
FIG. 4C is a block diagram illustrating the host computing device cluster of FIGS. 4A-4B being scaled-out via the inclusion of an additional storage domain, in accordance with some embodiments.

In some embodiments, the number of host computing devices within a single storage domain may be unlimited. In such embodiments, storage domain 300 may be scaled-out or grown without practical bounds. In other embodiments, the number of host computing devices within a single storage domain may be limited. In at least one embodiment, the number of host computing devices within storage domain 300 may be limited via a configuration of a cluster management model that is implemented to manage storage domain 300. For example, the cluster may be configured for a maximal amount of hosts per domain (e.g., a maximum of 32 host computing devices per storage domain). The default size of a storage domain (e.g., the maximal number of hosts per storage domain) may be configurable based on usage demands, customer needs, or other relevant factors. When additional host computing devices are added to the cluster, the hosts may be added to storage domains that include less than the maximal amount of allowed hosts (e.g., storage domain 300). As shown in FIG. 4C, if no storage domains are available for the inclusion of additional hosts, an additional storage domain may be added to the cluster, and the additional hosts may be included in the additional storage domain. In this way, the cluster may be scaled-out indefinitely by the addition of new storage domains to the cluster, while the size of any particular storage domain is finite and constrained via user configurations.

FIG. 4A is a block diagram illustrating a host computing device cluster 420, in accordance with some embodiments. Host computing device cluster 420 (or simply the cluster) may be similar to host computing device cluster 220 of FIGS. 2A-2B. Thus, cluster 420 may be included in a distributed-computing system, such as, but not limited to, system 200 of FIGS. 2A-2B. Cluster 420 may include N storage domains, where N is a positive integer. In some embodiments, N may be, for practical purposes unbounded. As illustrated in FIG. 4A, cluster 420 includes storage domain_1 430, storage domain_2 440, . . . , storage domain_N 450. Similar to cluster 220, cluster 420 includes a set and/or a plurality of host computing devices: host computing devices 422A-422M, 424A-424M, . . . , 426A-426M, where M is a positive integer. As discussed in conjunction with at least FIG. 2A, each of the host computing devices (or simply hosts) includes a processing resource and a storage resource. The processing and storage resource may be physical resources, virtualized resources, or a combination thereof.

In FIG. 4A, each of the host computing devices of cluster 420 has been uniquely associated with, included in, and/or assigned to one of the storage domains of cluster 420. For example, as shown in FIG. 4A, storage domain_1 430 includes host computing devices 422A-422M, storage domain_2 440 includes host computing devices 424A-424M, and storage domain_N 450 includes host computing devices 426A-426M. Even though it is illustrated as such, FIG. 4A is not meant to indicate that each of the N storage domains includes the same number of host computing devices (e.g., M). In embodiments not shown in FIG. 4A, the storage domains may include disparate numbers of host computing devices.

Furthermore, even though FIG. 4A depicts each of the hosts included in cluster 420 as being uniquely associated with exactly one of the N storage domains, in some embodiments, at least a portion of the hosts included in cluster 420 may not be associated with a storage domain. In such embodiments, only a portion of the hosts of cluster 420 may be subdivided or partitioned into the storage domains, while another portion of the hosts are not associated with any of the N storage domains. For example, one or more of the hosts of cluster 420 may be operated outside of the storage domains of cluster 420. Such non-associated hosts may provide processing and/or storage services without being included in one of the storage domains. In at least one embodiment, cluster 420 includes a first plurality of host computing devices and a second plurality of host computing devices. Each of the first plurality of host computing devices may be uniquely associated with, included in, and/or assigned to one of the storage domains, while at least one of the second plurality of host computing devices is not associated with any of the storage domains. Additionally, at least one of the (associated or non-associated) hosts not associated with a storage domain may not include at least one of a processing resource or a storage resource.

FIG. 4B is a block diagram illustrating additional details of the host computing device cluster 420 of FIG. 4A, in accordance with some embodiments. In FIG. 4B, for each of the storage domains, the processing and storage resource of the associated host computing devices have been aggregated to form a virtualized processing resource and a virtualized storage resource for the storage domain. For example, the processing resource of each of host computing devices 222A-222M has been aggregated to form processing resource_1 432 of storage domain_1 430. The storage resource of each of host computing devices 222A-222M has been aggregated to form storage resource (datastore_1 434) of storage domain_1 430. The processing resource of each of host computing devices 224A-224M has been aggregated to form processing resource_2 442 of storage domain_2 440. The storage resource of each of host computing devices 224A-224M has been aggregated to form storage resource (datastore_2 444) of storage domain_2 440. The processing resource of each of host computing devices 226A-226M has been aggregated to form processing resource_N 452 of storage domain_N 450. The storage resource of each of host computing devices 226A-226M has been aggregated to form storage resource (datastore_N 454) of storage domain_N 450.

In at least some embodiments, the processing and storage resource of the host computing devices associated with at least one of the storage domains of cluster 420 may not be aggregated to form a virtualized processing resource and/or a virtualized storage resource for the storage domain. That is, at least one of the storage domains of cluster 420 may be configured and arranged without at least one of a virtualized processing resource or a virtualized storage resource. For example, cluster 420 may include a first plurality of storage domains and a second plurality of storage domains. The first plurality of storage domains may be configured and arranged to include each of a virtualized processing resource and a virtualized storage resource, as shown in FIG. 4B. At least one of the storage domains included in the second plurality of storage domains may not include at least one of a virtualized processing resource or a virtualized storage resource. Such a storage domain is not illustrated in FIG. 4B. Furthermore, in at least one of the storage domains of cluster 420, at least one of the associated hosts may not be utilized in the formation of at least one of the virtualized processing resource or the virtualized storage resource of at least one of the storage domains.

Returning to FIG. 4B, processing resource_1 432 may implement a virtualization layer that includes one or more virtualized machine monitors (or hypervisors): VMM_1 436A, VMM_2 436B, . . . , VMM_M 436M. Processing resource_2 442 may implement a virtualization layer that includes one or more virtualized machine monitors: VMM_1 446A, VMM_2 446B, . . . , VMM_M 446M. Processing resource_N 452 may implement a virtualization layer that includes one or more virtualized machine monitors: VMM_1 456A, VMM_2 456B, . . . , VMM_M 456M. Although not indicated in FIG. 4B, the number of VMMs implemented by the various storage domain may not be balanced. That is, some storage domains may implement more or less VMMs than other storage domains. In some embodiments, each of the host computing devices associated with a particular storage domain may implement one VMM, and thus the number of VMMs included in a processing resource of a storage domain may be equivalent to the number of hosts included in the storage domain. In other embodiments, there may be more or less hosts than VMMs included in a storage domain. In such embodiments, at least one of the host computing devices may implement more than one VMM.

As also shown in FIG. 4B, each of the processing resources may implement one or more VMs. For example, VMMs 436A-436M of processing resource_1 432 of storage domain_1 430 may implement or host VM set_1 438. Thus, storage domain_1 430 may provide one or more VMs to users. Each of the VMs in VM set_1 438 may have access to at least a portion of storage services provided by datastore_1 434 of storage domain_1 430, while being restricted from accessing the storage services provided by the datastores published by other storage domains (e.g., datastore_2 444 of storage domain_2 440 and datastore_N 454 of storage domain_N 450). VMMs 446A-446M of processing resource_2 442 of storage domain_2 440 may implement or host VM set_2 448. Thus, storage domain_2 440 may provide one or more VMs to users. Each of the VMs in VM set_2 448 may have access to at least a portion of storage services provided by datastore_2 444 of storage domain_2 440, and be restricted from accessing the storage services provided by the datastores published by other storage domains (e.g., datastore_1 434 of storage domain_1 430 and datastore_N 454 of storage domain_N 450). Likewise, VMMs 456A-456M of processing resource_N 452 of storage domain_N 450 may implement or host VM set_N 458. Thus, storage domain_N 450 may provide one or more VMs to users. Each of the VMs in VM set_N 458 may have access to at least a portion of storage services provided by datastore_N 454 of storage domain_N 450, and be restricted from accessing the storage services provided by the datastores published by other storage domains (e.g., datastore_1 434 of storage domain_1 430 and datastore_2 444 of storage domain_2 440).

As also illustrated in FIG. 4B, at each of the storage domains, the virtualized processing resources (processing resource_1 432, processing resource_2 442, . . . , processing resource_N 452) of the storage domains may be aggregated to form a processing resource pool 480 of the cluster 420. Likewise, at each of the storage domains, the virtualized storage resource (datastore_1 434, datastore_2 444, . . . , datastore_N 454) of the storage domains may be aggregated to form a storage resource pool 490 of the cluster 420. The processing resource pool 480 may be disaggregated from the storage resource pool 490 such that the processing resource pool 480 and the storage resource pool 490 form non-overlapping or non-intersecting sub-clusters of cluster 420.

Cluster 420 may be scaled-out or grown via the inclusion of additional storage domains that include additional host computing devices. FIG. 4C is a block diagram illustrating the host computing device cluster 420 of FIGS. 4A-4B being scaled-out via the inclusion of an additional storage domain, in accordance with some embodiments. More specifically, FIG. 4C illustrates the inclusion of storage domain_(N+1) 460 in cluster 420. Although not explicitly shown in FIG. 4C, storage domain_(N+1) may be implemented by the inclusion of additional host computing devices to cluster 420. Similar to the already existing storage domains, newly added storage domain_(N+1) 460 includes processing resource_(N+1) 462 that implements VMMS: VMM_1 466A, VMM_2 466B, . . . , VMM_M 466M. These newly added VMMs provide VM set_(N+1) 468. Storage domain_(N+1) 460 also publishes datastore_(N+1) 464, which may be accessible by the VMs included in VM set_(N+1) 468. The processing resource_(N+1) 462 of newly added storage domain_(N+1) 460 has been included in processing resource pool 480 of cluster 420. Likewise, the datastore_(N+1) 464 of newly added storage domain_(N+1) 460 has been included in storage resource pool 490 of cluster 420. Thus, cluster 420 has been scaled-out, grown, and/or increased by the inclusion of the additional storage domain: storage domain_(N+1) 460. In some embodiments, the number of storage domains within a single cluster may be unlimited. In such embodiments, cluster 420 may be scaled-out or grown without practical bounds.

Figure 4D:
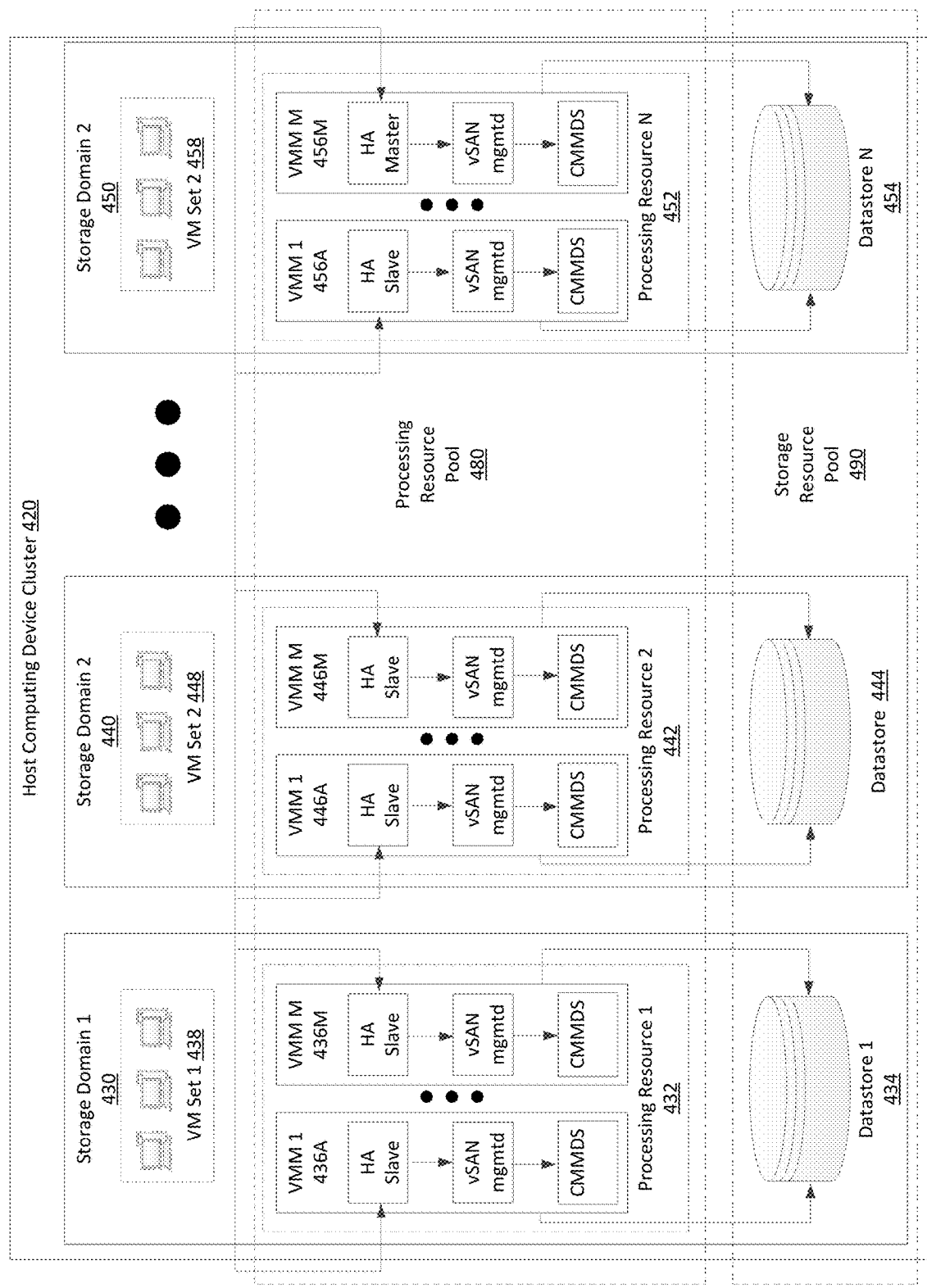
FIG. 4D is a block diagram illustrating still additional details of the host computing device cluster of FIGS. 4A-4B, in accordance with some embodiments.

FIG. 4D is a block diagram illustrating still additional details of the host computing device cluster 420 of FIGS. 4A-4B, in accordance with some embodiments. As noted above, the reliability and durability of the operation of cluster 420 may be sufficient enough that cluster 420 may be said to be a high availability (HA) cluster and the services provided by cluster 420 may be referred to as HA services. In such embodiments, the HA cluster 420 may be enabled to provide continuous service, without significant interruption and for a sufficient amount of time, so that users and clients of cluster 420 may reliably depend on the HA of the interruption-free services of the cluster. To at least partially enable such HA services, each of the VMMs of cluster 420 include one or more modules that assist in the HA services. In the embodiments shown in FIG. 4D, each of the VMMs includes at least a HA module, a vSAN management module, and a cluster monitoring, membership, and directory service (CMMDS) module. The HA module may be partially responsible for accessing and monitoring various metadata and the status of VMs and their associated datastores. The vSAN management module may be generally responsible for providing at least some management services to the associated datastore. The CMMDS module may be at least partially responsible for monitoring the cluster's membership and providing directory services for the membership.

Because the VMMs are distributed across a plurality of storage domains, HA modules may be configured in a master/slave arrangement. The VMM of one of the hosts may include a HA master module, while the remaining VMMs of the remaining hosts include a HA slave module. The HA modules may work in a proxy mode, such that the HA master module may manage and protect the metadata of the VMs. The HA master module may manage and protect the metadata of the VMs within the HA master module's own VMM (or storage domain). Furthermore, the HA master module may manage and protect the metadata of VMs outside the HA master module's VMM (or storage domain) via coordination and/or communication with the HA slave modules in the VMMs outside of the HA master module's VMM (or storage domain).

In the non-limiting embodiment shown in FIG. 4D, VMM_M 456M includes the HA master module (i.e., HA master), and each of the other VMMs includes a HA slave module (i.e., HA slave). As also shown in FIG. 4D, each of the VMMs also includes a vSAN management module (i.e., vSAN mgmtd) and a CMMDS module (i.e., CMMDS). The arrowed lines indicate a communication bus between the various modules.

Figure 5A:
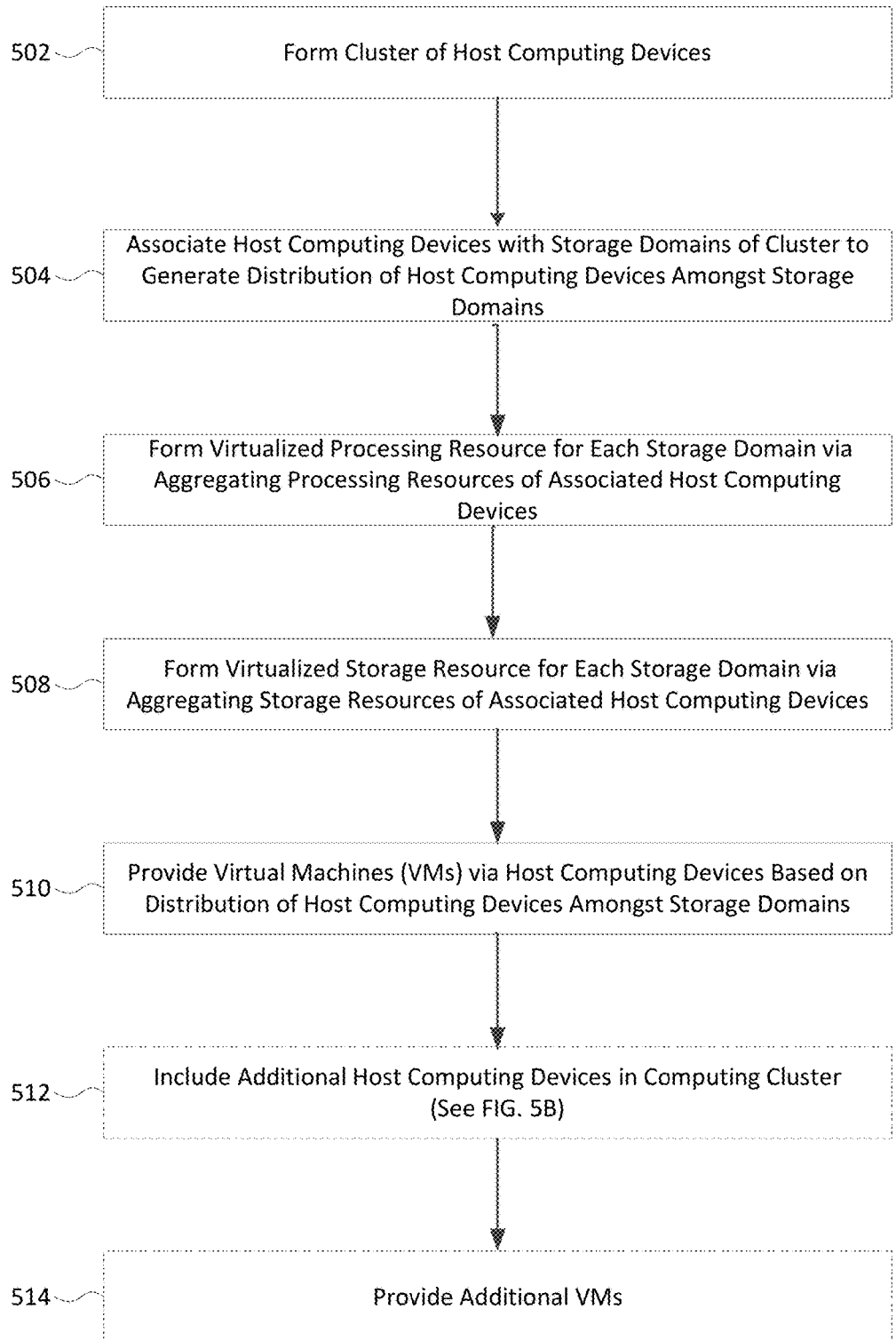
FIGS. 5A-5B illustrate flowcharts of exemplary processes for operating a host computing device cluster in a distributed-computing system, in accordance with some embodiments.

FIG. 5A illustrates a flowchart of exemplary process 500 for operating a computing cluster in a distributed-computing system, in accordance with some embodiments. At least portions of process 500 may be performed, for example, by one or more computing devices included in the distributed system (e.g., system 200 of FIGS. 2A-2B). In some embodiments, the distributed-computing system comprises host computing devices (e.g., host computing device 100 described in reference to FIG. 1A) that are communicatively coupled to a management computing device (e.g., management computing device 280 of FIGS. 2A-2B) that implements a cluster management model via a communication network (e.g., network 210 of FIGS. 2A-2B). The cluster management model may be a configurable management model that is employed to manage the cluster. In some embodiments, the distributed-computing system may be implemented by one or more virtual machines (e.g., VM 102 described in reference to FIGS. 1A-1B). In process 500, some blocks are, optionally, combined, the order of some blocks is, optionally, changed, and some blocks are, optionally, omitted. In some embodiments, additional operations may be performed in combination with process 500.

At block 502, a cluster of host computing devices (e.g., host computing device cluster 220 of FIGS. 2A-2C and/or host computing device cluster 420 of FIGS. 4A-4C) may be formed or created. As discussed throughout, the cluster may include a set or plurality of host computing devices (or simply hosts). The cluster may be a computing cluster, such as, but not limited to, a hyperconverged infrastructure (HCI) cluster.

At block 504, in accordance with a cluster management policy, each of the hosts is associated with one of a plurality of storage domains of the cluster. Associating the hosts with the storage domains may include subdividing or partitioning the hosts into the plurality of storage domains. The cluster management policy may be employed to configure a cluster management model. In some embodiments, each of the hosts is uniquely associated with exactly one of the plurality of storage domains. That is, the hosts are subdivided into the plurality of storage domains to generate or form a distribution of the plurality of hosts amongst the plurality of storage domains. As noted throughout, each of the hosts may include at least one processing resource and at least one storage resource. The processing and storage resources of the hosts may include physical processing and physical storage resources of the hosts. The cluster management policy may be a configurable policy for the cluster management model. The cluster management model may be implemented by a cluster management computing device (e.g., management computing device 280 of FIGS. 2A-2B).

In some embodiments, at least a portion of the hosts included in the cluster may not be associated with a storage domain. In such embodiments, only a portion of the hosts of the cluster may be subdivided or partitioned into the storage domains, while another portion of the hosts are not associated with any of the storage domains. For example, one or more of the hosts of the cluster may be operated outside of the storage domains of the cluster. Such non-associated hosts may provide processing and/or storage services without being included in one of the storage domains. In at least one embodiment, the cluster includes a first plurality of host computing devices and a second plurality of host computing devices. Each of the first plurality of host computing devices may be uniquely associated with, included in, and/or assigned to one of the storage domains, while at least one of the second plurality of host computing devices is not associated with any of the storage domains. Additionally, at least one of the (associated or non-associated) hosts of the cluster may not include at least one of a physical processing resource or a physical storage resource.

At block 506, a virtualized processing resource for each of the storage domains may be formed. More specifically, for each of the storage domains, the processing resource of each of the associated hosts may be aggregated to form the virtualized processing resource of the storage domain. Also at block 506, a processing resource pool of the cluster may be formed via an aggregation of the virtualized processing resource of each of the plurality of storage domains in the cluster.

At block 508, a virtualized storage resource for each of the storage domains may be formed. More specifically, for each of the storage domains, the storage resource of each of the associated hosts may be aggregated to form the virtualized storage resource of the storage domain. The virtualized storage resource of a storage domain may be or include a virtualized datastore published by the storage domain. Also at block 508, a storage resource pool of the cluster may be formed via an aggregation of the virtualized storage resource of each of the plurality of storage domains in the cluster. The processing resource pool of the cluster may be disaggregated from the storage resource pool of the cluster, such that the processing resource pool and the storage resource pool form non-overlapping and/or non-intersecting (e.g., disaggregated) sub-clusters of the cluster.

In at least some embodiments and at blocks 506 and/or 508, the processing and storage resource of the host computing devices associated with at least one of the storage domains of the cluster, may not be aggregated to form a virtualized processing resource and/or a virtualized storage resource for the storage domain. That is, at least one of the storage domains of the cluster may be configured and arranged without at least one of a virtualized processing resource or a virtualized storage resource. For example, the cluster may include a first plurality of storage domains and a second plurality of storage domains. The first plurality of storage domains may be configured and arranged to include each of a virtualized processing resource and a virtualized storage resource, as shown in FIG. 4B above. At least one of the storage domains included in the second plurality of storage domains may not include at least one of a virtualized processing resource or a virtualized storage resource. Furthermore, in at least one of the storage domains of the cluster, at least one of the associated or included hosts may not be utilized in the formation of at least one of the virtualized processing resource or the virtualized storage resource of at least one of the storage domains.

At block 510, a plurality of virtualized machines (VMs) is provided via an employment of the hosts, in accordance to (or based on) the distribution of the hosts amongst the storage domains. That is, based on the distribution, the hosts are employed to provide the VMs. Each of the VMs is associated with one of the storage domains. Each VM may be implemented by at least a portion of the virtualized processing resource of its associated storage domain and may have access to data services provided by at least a portion of the virtualized datastore published by its associated storage domain. In some embodiments, each of the plurality of host computing devices hosts a separate virtual machine monitor (VMM) that monitors and supervises a portion of the plurality of VMs that is implemented by the physical processing resource of the host computing device that hosts the VMM. The management model may enable configuring a default size of each of a plurality of storage domains of the cluster. In some embodiments, the configurable management model further enables deploying, decommissioning, and recycling each of a plurality of VMs.

A first VM of the plurality of VMs may be associated with a first storage domain of the plurality of storage domains. The first VM may be implemented by a first physical processing resource of a first host that is associated with the first storage domain. The first VM may be isolated from a second host computing device associated with the first storage domain. That is, the fault may be isolated to the first host. In some embodiments, each of the plurality of storage domains may be associated with a separate fault isolation policy. A fault isolation policy may configure a fault isolation process for a portion of the plurality of host computing devices associated with the associated fault domain. The first VM may be provided access to a second physical storage resource of the second host associated with the first storage domain.

In various embodiments, each of the plurality of host computing devices implements a high availability (HA) module. A HA module may have access to metadata associated with a portion of the plurality of VMs that is implemented by the host computing device. In some of these embodiments, a first HA module that is implemented by a first host computing device of the plurality of host computing devices may be a HA master module. Other HA modules implemented by each of the other host computing devices of the plurality of host computing devices may be HA slave modules. The HA master module may be communicatively coupled to each of the HA slave modules. The HA master module may have access to metadata associated with each of the plurality of VMs via being communicatively coupled to each of the HA slave modules.

At optional block 512, one or more additional hosts may be added to the cluster. Various embodiments of including or adding one or more additional hosts to the cluster are discussed in conjunction with FIG. 5B. However, briefly here, the additional hosts may be included in the cluster based on a comparison between the configurable cluster management policy and the current distribution of the hosts amongst the plurality of storage domains. If a storage domain exists where the current number of hosts included in the storage domain does not exceed a maximal amount of hosts per domain (e.g., 32 hosts), then one or more additional hosts may be added to the existing storage domain. If all the existing storage domains currently include the maximal allowed number of hosts, then an additional storage domain may be created and added to the cluster, and one or more additional hosts may be included in the newly created storage domain. In some embodiments, one or more additional hosts may be distributed amongst one or more existing storage domains, one or more newly created storage domains, or a combination thereof, depending upon the anticipated use of the additional hosts. The cluster management model may be employed to determine how to distribute the additional hosts amongst existing and/or newly created storage domains. Upon adding one or more additional hosts and associating the additional hosts with one or more storage domains, the distribution of the plurality of hosts amongst the storage domains may be updated to reflect the current association of the hosts with the storage domains.

At optional block 514, one or more additional VMs may be provided. The additional VMs may be provided in response to receiving a request for providing one or more additional VMs. In at least one embodiment, the request for the additional VMs may indicate one or more storage domains for which to implement the VMs on. In embodiments where one or more additional hosts have been added to the cluster, the VMs may be provided by one or more additional hosts added to the cluster. In embodiments where no additional hosts have been added to the cluster, the additional VMs may be provided by hosts already included as hosts in the cluster. In some embodiments, a first host of the plurality of hosts may be identified based on a current utilization of the processing resources of the hosts. The identified first host may be employed to provide one or more additional VMs.

For example, in at least one embodiment where the request indicates a storage domain, a request for providing an additional VM associated with a first storage domain of the plurality of storage domains may be received. In response to receiving the request, a first host computing device included in a portion of the plurality of host computing devices associated with the first storage domain may be identified. Identifying the first host computing device may be based on a current utilization of the physical processing resource of each of the host computing devices included in the portion of the plurality of host computing devices associated with the first storage domain. A first physical processing resource of the first host computing device may be employed to implement the additional VM. The additional VM may be associated with the first storage domain, may have access to at least a portion of a first virtualized processing resource and at least a portion of a first virtualized datastore of the first storage domain, and may be provided with the plurality of VMs. The portion of the first virtualized datastore that the additional VM has access to may include a second physical storage resource of a second host computing device included in the portion of the plurality of host computing devices associated with the first storage domain.

In embodiments where the request does not indicate a storage domain, a request for providing an additional VM may be received. In response to receiving the request, a first storage domain of the plurality of storage domains may be identified. Identifying the first storage domain may be based on a current utilization of the virtualized datastores of each of the plurality of storage domains. A first virtualized processing resource of the first storage domain may be employed to implement the additional VM. The additional VM may have access to at least a portion of a first virtualized datastore of the first storage domain and may be provided with the plurality of VMs. In some of these embodiments, and in response to identifying the first storage domain, a first host computing device included in a portion of the plurality of host computing devices associated with the identified first storage domain may be identified. Identifying the first host computing device may be based on a current utilization of the physical processing resource of each of the host computing devices included in the portion of the plurality of host computing devices associated with the first storage domain. A first physical processing resource of the first host computing device may be employed to implement the additional VM.

Figure 5B:
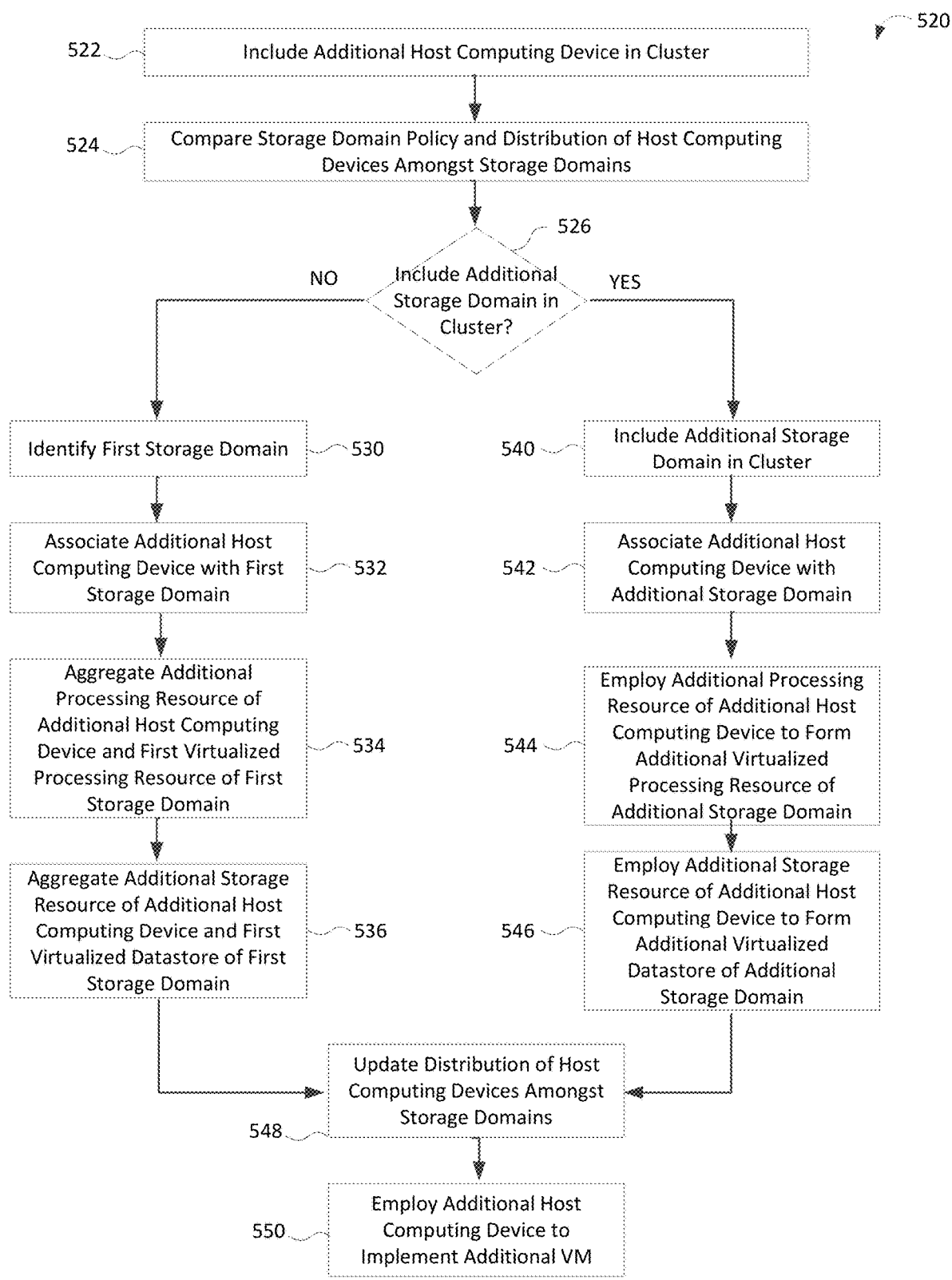

FIG. 5B illustrates a flowchart of exemplary process 520 for including additional host computing devices to a computing cluster in a distributed-computing system, in accordance with some embodiments. At block 522, one or more additional host computing devices may be added or included in the computing cluster. The additional host may include an additional processing resource and an additional storage resource. The additional resources of the additional host may be physical resources. At block 524, a storage domain policy may be compared to the current distribution of the hosts amongst the storage domains. The storage domain policy may be a configurable policy of the management model implemented by the management computing device. In at least one embodiment, the policy may be configurable to indicate a maximal or default amount of hosts per storage domain.

At decision block 526, it is decided whether to include an additional storage domain in the cluster. The decision may be based on the comparison of block 524. In some embodiments, if a storage domain exists that does not include the maximal amount of hosts, an additional storage domain may not be required to be included in the cluster. If such a storage domain exists, then process 520 may flow to block 530. If each of the existing storage domains includes the maximal amount of hosts, then an additional storage domain may be added to the cluster. If all of the existing storage domains are full of hosts, then process 520 may flow to block 540.

At block 530, a first storage domain of the storage domains may be identified. The first storage domain may include less than the maximal amount of hosts. The identification may be performed in response to the comparison between the configurable policy of the cluster and the distribution of the hosts amongst the storage domains. At block 532, the additional host computing device may be associated with the identified first storage domain.

At block 534, the additional processing resource of the additional host computing device and a first virtualized processing resource of the first storage domain may be aggregated. Aggregating the additional processing resource and the first virtualized processing resource may increase a processing capacity of the first virtualized processing resource of the first storage domain. At block 536, the additional storage resource of the additional host computing device and a first virtualized datastore of the first storage domain may be aggregated. Aggregating the additional storage resource and the first virtualized datastore may increase a storage capacity of the first virtualized datastore of the first storage domain. As shown in FIG. 5B, process 520 may then flow to block 548.

At block 540, and in response to the comparison of block 524, an additional storage domain may be included in the plurality of storage domains. At block 542, the additional host computing device may be associated with the additional storage domain. At block 544, the additional processing resource of the additional host computing device may be employed to form an additional virtualized processing resource of the additional storage domain. At block 546, the additional storage resource of the additional host computing device may be employed to form an additional virtualized datastore of the additional storage domain. Process 520 may then flow to block 548.

At block 548, the distribution of the host computing devices amongst the storage domains may be updated to reflect the inclusion of the additional host computing device. In embodiments where the first storage domain is identified, and in response to associating the additional host computing device with the first storage domain, the distribution of the plurality of host computing devices amongst the plurality of storage domains may be updated to include the association of the additional host computing device with the first storage domain. In embodiments where the first storage domain is included in the cluster, and in response to associating the additional host computing device with the additional storage domain, the distribution of the plurality of host computing devices amongst the plurality of storage domains may be updated to include the association of the additional host computing device with the additional storage domain.

At block 550, the additional host may be employed to implement one or more additional VMs. Based on the updated distribution of the plurality of host computing devices amongst the plurality of storage domains, the additional host computing device may be employed to implement the additional VM. In embodiments where the first storage domain is identified, the additional VM may be associated with the first storage domain, may have access to the increased processing capacity and the increased storage capacity of the first virtualized datastore of the first storage domain, and may be provided with the plurality of VMs. In embodiments where the additional storage domain is included in the cluster, the additional VM may be associated with the additional storage domain, may have access to the additional virtualized processing resource and the additional virtualized datastore of the additional storage domain, and may be provided with the plurality of VMs.

In accordance with some implementations, a computer-readable storage medium (e.g., a non-transitory computer-readable storage medium) is provided, the computer-readable storage medium storing one or more programs for execution by one or more processors of an electronic device, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for operating a computing cluster that includes a plurality of host computing devices, the method comprising:
   at a management computing device having one or more processors and memory:
   uniquely associating each of the plurality of host computing devices with one of a plurality of storage domains to generate a distribution of the plurality of host computing devices amongst the plurality of storage domains, wherein each of the plurality of host computing devices includes a physical processing resource and a physical storage resource;
   for each of the plurality of storage domains, aggregating the physical processing resource of each of the host computing devices associated with the storage domain to form a virtualized processing resource of the storage domain;
   for each of the plurality of storage domains, aggregating the physical storage resource of each of the host computing devices associated with the storage domain to form a virtualized datastore of the storage domain; and
   based on the distribution of the plurality of host computing devices amongst the plurality of storage domains, employing the plurality of host computing devices to provide a plurality of virtualized machines (VMs), wherein each of the plurality of VMs is associated with one of the plurality of storage domains, is implemented by at least a portion of the virtualized processing resource of the associated storage domain, and has access to at least a portion of the virtualized datastore of the associated storage domain,
   wherein a first VM of the provided plurality of VMs is associated with a first storage domain of the plurality of storage domains, is implemented by a first physical processing resource of a first host computing device associated with the first storage domain, and a fault occurring in the first VM is isolated from a second host computing device associated with the first storage domain.

2. The method of claim 1, wherein an aggregation of the virtualized processing resource of each of the plurality of storage domains forms a processing resource pool of the computing cluster, an aggregation of the virtualized datastore of each of the plurality of storage domains forms a storage resource pool of the computing cluster, and the processing resource pool is disaggregated from the storage resource pool such that the processing resource pool and the storage resource pool form disaggregated sub-clusters of the computing cluster.

3. The method of claim 1, further comprising:
including an additional host computing device in the computing cluster, wherein the additional host computing device includes an additional processing resource and an additional storage resource;
in response to a comparison between a configurable policy of the computing cluster and the distribution of the plurality of host computing device amongst the plurality of storage domains, associating the additional host computing device with a first storage domain of the plurality of storage domains;
aggregating the additional processing resource of the additional host computing device and a first virtualized processing resource of the first storage domain to increase a processing capacity of the first virtualized processing resource of the first storage domain;
aggregating the additional storage resource of the additional host computing device and a first virtualized datastore of the first storage domain to increase a storage capacity of the first virtualized datastore of the first storage domain;
in response to associating the additional host computing device with the first storage domain, updating the distribution of the plurality of host computing devices amongst the plurality of storage domains to include the association of the additional host computing device with the first storage domain; and
based on the updated distribution of the plurality of host computing devices amongst the plurality of storage domains, employing the additional host computing device to implement an additional VM, wherein the additional VM is associated with the first storage domain, has access to the increased processing capacity and the increased storage capacity of the first virtualized datastore of the first storage domain, and is provided with the plurality of VMs.

4. The method of claim 1, further comprising:
including an additional host computing device in the computing cluster, wherein the additional host computing device includes an additional processing resource and an additional storage resource;
in response to a comparison between a configurable policy of the computing cluster and the distribution of the plurality of host computing devices amongst the plurality of storage domains, including an additional storage domain in the plurality of storage domains;
associating the additional host computing device with the additional storage domain;
employing the additional processing resource of the additional host computing device to form an additional virtualized processing resource of the additional storage domain;
employing the additional storage resource of the additional host computing device to form an additional virtualized datastore of the additional storage domain;
in response to associating the additional host computing device with the additional storage domain, updating the distribution of the plurality of host computing devices amongst the plurality of storage domains to include the association of the additional host computing device with the additional storage domain; and
based on the updated distribution of the plurality of host computing devices amongst the plurality of storage domains, employing the additional host computing device to implement an additional VM, wherein the additional VM is associated with the additional storage domain, has access to the additional virtualized processing resource and the additional virtualized datastore of the additional storage domain, and is provided with the plurality of VMs.

5. The method of claim 1, further comprising:
in response to receiving a request for providing an additional VM associated with a first storage domain of the plurality of storage domains, identifying a first host computing device included in a portion of the plurality of host computing devices associated with the first storage domain, wherein identifying the first host computing device is based on a current utilization of the physical processing resource of each of the host computing devices included in the portion of the plurality of host computing devices associated with the first storage domain; and
employing a first physical processing resource of the first host computing device to implement the additional VM, wherein the additional VM is associated with the first storage domain, has access to at least a portion of a first virtualized processing resource and at least a portion of a first virtualized datastore of the first storage domain, and is provided with the plurality of VMs.

6. The method of claim 5, wherein the portion of the first virtualized datastore that the additional VM has access to includes a second physical storage resource of a second host computing device included in the portion of the plurality of host computing devices associated with the first storage domain.

7. The method of claim 1, further comprising:
in response to receiving a request for providing an additional VM, identifying a first storage domain of the plurality of storage domain based on a current utilization of the virtualized datastores of each of the plurality of storage domains;
employing a first virtualized processing resource of the first storage domain to implement the additional VM, wherein the additional VM has access to at least a portion of a first virtualized datastore of the first storage domain and is provided with the plurality of VMs.

8. The method of claim 7, further comprising:
in response to identifying the first storage domain, identifying a first host computing device included in a portion of the plurality of host computing devices associated with the identified first storage domain, wherein identifying the first host computing device is based on a current utilization of the physical processing resource of each of the host computing devices included in the portion of the plurality of host computing devices associated with the first storage domain; and
employing a first physical processing resource of the first host computing device to implement the additional VM.

9. The method of claim 1, wherein a first VM is provided access to a second physical storage resource of the second host computing device.

10. The method of claim 1, wherein each of the plurality of storage domains is associated with a separate fault isolation policy that configures a fault isolation process for a portion of the plurality of host computing devices associated with the associated fault domain.

11. The method of claim 1, wherein each of the plurality of host computing devices hosts a separate virtual machine monitor (VMM) that monitors and supervises a portion of the plurality of VMs that is implemented by the physical processing resource of the host computing device that hosts the VMM.

12. The method of claim 1, wherein a configurable management model is implemented by the management computing device, and the management model is employed to manage the computing cluster.

13. The method of claim 12, wherein the configurable management model enables configuring a default size of each of the plurality of storage domains.

14. The method of claim 12, wherein the configurable management model enables deploying, decommissioning, and recycling each of the plurality of VMs.

15. The method of claim 1, wherein each of the plurality of host computing devices implements a high availability (HA) module that has access to metadata associated with a portion of the plurality of VMs that is implemented by the host computing device.

16. The method of claim 15, a first HA module implemented by a first host computing device of the plurality of host computing devices is a HA master module, other HA modules implemented by each of the other host computing devices of the plurality of host computing devices are HA slave modules, and the HA master module is communicatively coupled to each of the HA slave modules.

17. The method of claim 16, wherein the HA master module has access to metadata associated with each of the plurality of VMs via being communicatively coupled to each of the HA slave modules.

18. A non-transitory computer-readable storage medium storing one or more programs configured to be executed by a management computing device that operates a computing cluster that includes a plurality of host computing devices, the management computing device having one or more processors and memory, the one or more programs including instructions for:
  uniquely associating each of the plurality of host computing devices with one of a plurality of storage domains to generate a distribution of the plurality of host computing devices amongst the plurality of storage domains, wherein each of the plurality of host computing devices includes a physical processing resource and a physical storage resource;
  for each of the plurality of storage domains, aggregating the physical processing resource of each of the host computing devices associated with the storage domain to form a virtualized processing resource of the storage domain;
  for each of the plurality of storage domains, aggregating the physical storage resource of each of the host computing devices associated with the storage domain to form a virtualized datastore of the storage domain; and
  based on the distribution of the plurality of host computing devices amongst the plurality of storage domains, employing the plurality of host computing devices to provide a plurality of virtualized machines (VMs), wherein each of the plurality of VMs is associated with one of the plurality of storage domains, is implemented by at least a portion of the virtualized processing resource of the associated storage domain, and has access to at least a portion of the virtualized datastore of the associated storage domain,
  wherein a first VM of the provided plurality of VMs is associated with a first storage domain of the plurality of storage domains, is implemented by a first physical processing resource of a first host computing device associated with the first storage domain, and a fault occurring in the first VM is isolated from a second host computing device associated with the first storage domain.

19. The non-transitory computer-readable storage medium of claim 18, wherein an aggregation of the virtualized processing resource of each of the plurality of storage domains forms a processing resource pool of the computing cluster, an aggregation of the virtualized datastore of each of the plurality of storage domains forms a storage resource pool of the computing cluster, and the processing resource pool is disaggregated from the storage resource pool such that the processing resource pool and the storage resource pool form disaggregated sub-clusters of the computing cluster.

20. A distributed-computing system comprising:
  a computing cluster that includes a plurality of host computing devices; and
  a management computing device having one or more processors and memory storing one or more programs configured to be executed by the one or more processors, the one or more programs including instructions for:
  uniquely associating each of the plurality of host computing devices with one of a plurality of storage domains to generate a distribution of the plurality of host computing devices amongst the plurality of storage domains, wherein each of the plurality of host computing devices includes a physical processing resource and a physical storage resource;
  for each of the plurality of storage domains, aggregating the physical processing resource of each of the host computing devices associated with the storage domain to form a virtualized processing resource of the storage domain;
  for each of the plurality of storage domains, aggregating the physical storage resource of each of the host computing devices associated with the storage domain to form a virtualized datastore of the storage domain; and
  based on the distribution of the plurality of host computing devices amongst the plurality of storage domains, employing the plurality of host computing devices to provide a plurality of virtualized machines (VMs), wherein each of the plurality of VMs is associated with one of the plurality of storage domains, is implemented by at least a portion of the virtualized processing resource of the associated storage domain, and has access to at least a portion of the virtualized datastore of the associated storage domain,
  wherein a first VM of the provided plurality of VMs is associated with a first storage domain of the plurality of storage domains, is implemented by a first physical processing resource of a first host computing device associated with the first storage domain, and a fault occurring in the first VM is isolated from a second host computing device associated with the first storage domain.

21. The distributed-computing system of claim 20, wherein an aggregation of the virtualized processing resource of each of the plurality of storage domains forms a processing resource pool of the computing cluster, an aggregation of the virtualized datastore of each of the plurality of storage domains forms a storage resource pool of the computing cluster, and the processing resource pool is disaggregated from the storage resource pool such that the processing resource pool and the storage resource pool form disaggregated sub-clusters of the computing cluster.

22. A method for operating a computing cluster that includes a plurality of host computing devices, the method comprising:
at a management computing device having one or more processors and memory:
uniquely associating each of the plurality of host computing devices with one of a plurality of storage domains to generate a distribution of the plurality of host computing devices amongst the plurality of storage domains, wherein each of the plurality of host computing devices includes a physical processing resource and a physical storage resource;
for each of the plurality of storage domains, aggregating the physical processing resource of each of the host computing devices associated with the storage domain to form a virtualized processing resource of the storage domain;
for each of the plurality of storage domains, aggregating the physical storage resource of each of the host computing devices associated with the storage domain to form a virtualized datastore of the storage domain; and
based on the distribution of the plurality of host computing devices amongst the plurality of storage domains, employing the plurality of host computing devices to provide a plurality of virtualized machines (VMs), wherein each of the plurality of VMs is associated with one of the plurality of storage domains, is implemented by at least a portion of the virtualized processing resource of the associated storage domain, and has access to at least a portion of the virtualized datastore of the associated storage domain,
wherein an aggregation of the virtualized processing resource of each of the plurality of storage domains forms a processing resource pool of the computing cluster, an aggregation of the virtualized datastore of each of the plurality of storage domains forms a storage resource pool of the computing cluster, and the processing resource pool is disaggregated from the storage resource pool such that the processing resource pool and the storage resource pool form disaggregated sub-clusters of the computing cluster.

23. The method of claim 22, wherein a first VM of the provided plurality of VMs is associated with a first storage domain of the plurality of storage domains, is implemented by a first physical processing resource of a first host computing device associated with the first storage domain, and a fault occurring in the first VM is isolated from a second host computing device associated with the first storage domain.

24. A distributed-computing system comprising:
a computing cluster that includes a plurality of host computing devices; and
a management computing device having one or more processors and memory storing one or more programs configured to be executed by the one or more processors, the one or more programs including instructions for:
uniquely associating each of the plurality of host computing devices with one of a plurality of storage domains to generate a distribution of the plurality of host computing devices amongst the plurality of storage domains, wherein each of the plurality of host computing devices includes a physical processing resource and a physical storage resource;
for each of the plurality of storage domains, aggregating the physical processing resource of each of the host computing devices associated with the storage domain to form a virtualized processing resource of the storage domain;
for each of the plurality of storage domains, aggregating the physical storage resource of each of the host computing devices associated with the storage domain to form a virtualized datastore of the storage domain; and
based on the distribution of the plurality of host computing devices amongst the plurality of storage domains, employing the plurality of host computing devices to provide a plurality of virtualized machines (VMs), wherein each of the plurality of VMs is associated with one of the plurality of storage domains, is implemented by at least a portion of the virtualized processing resource of the associated storage domain, and has access to at least a portion of the virtualized datastore of the associated storage domain,
wherein an aggregation of the virtualized processing resource of each of the plurality of storage domains forms a processing resource pool of the computing cluster, an aggregation of the virtualized datastore of each of the plurality of storage domains forms a storage resource pool of the computing cluster, and the processing resource pool is disaggregated from the storage resource pool such that the processing resource pool and the storage resource pool form disaggregated sub-clusters of the computing cluster.

25. The distributed-computing system of claim 24, wherein a first VM of the provided plurality of VMs is associated with a first storage domain of the plurality of storage domains, is implemented by a first physical processing resource of a first host computing device associated with the first storage domain, and a fault occurring in the first VM is isolated from a second host computing device associated with the first storage domain.

26. A non-transitory computer-readable storage medium storing one or more programs configured to be executed by a management computing device that operates a computing cluster that includes a plurality of host computing devices, the management computing device having one or more processors and memory, the one or more programs including instructions for:
uniquely associating each of the plurality of host computing devices with one of a plurality of storage domains to generate a distribution of the plurality of host computing devices amongst the plurality of storage domains, wherein each of the plurality of host computing devices includes a physical processing resource and a physical storage resource;
for each of the plurality of storage domains, aggregating the physical processing resource of each of the host computing devices associated with the storage domain to form a virtualized processing resource of the storage domain;
for each of the plurality of storage domains, aggregating the physical storage resource of each of the host computing devices associated with the storage domain to form a virtualized datastore of the storage domain; and
based on the distribution of the plurality of host computing devices amongst the plurality of storage domains, employing the plurality of host computing devices to provide a plurality of virtualized machines (VMs), wherein each of the plurality of VMs is associated with one of the plurality of storage domains, is implemented by at least a portion of the virtualized processing resource of the associated storage domain, and has access to at least a portion of the virtualized datastore of the associated storage domain, wherein an aggregation of the virtualized processing resource of each of the plurality of storage domains forms a processing resource pool of the computing cluster, an aggregation of the virtualized datastore of each of the plurality of storage domains forms a storage resource pool of the computing cluster, and the processing resource pool is disaggregated from the storage resource pool such that the processing resource pool and the storage resource pool form disaggregated sub-clusters of the computing cluster.

27. The non-transitory computer-readable storage medium of claim 26, wherein a first VM of the provided plurality of VMs is associated with a first storage domain of the plurality of storage domains, is implemented by a first physical processing resource of a first host computing device associated with the first storage domain, and a fault occurring in the first VM is isolated from a second host computing device associated with the first storage domain.

* * * * *